US012746479B2

(12) United States Patent
Sun

(10) Patent No.: US 12,746,479 B2
(45) Date of Patent: Sep. 29, 2026

(54) CLOUD GAME STARTING METHODS, APPARATUSES, AND SYSTEMS, COMPUTER DEVICE AND STORAGE MEDIA

(71) Applicant: NETEASE (HANGZHOU) NETWORK CO., LTD., Hangzhou (CN)

(72) Inventor: Zheng Sun, Hangzhou (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 272 days.

(21) Appl. No.: 18/555,510

(22) PCT Filed: Sep. 26, 2022

(86) PCT No.: PCT/CN2022/121462
§ 371 (c)(1),
(2) Date: Oct. 13, 2023

(87) PCT Pub. No.: WO2023/213042
PCT Pub. Date: Nov. 9, 2023

(65) Prior Publication Data

US 2024/0207741 A1 Jun. 27, 2024

(30) Foreign Application Priority Data

May 6, 2022 (CN) ......................... 202210489667.7

(51) Int. Cl.
*A63F 13/533* (2014.01)
*A63F 13/69* (2014.01)
(Continued)

(52) U.S. Cl.
CPC ............ *A63F 13/77* (2014.09); *A63F 13/533* (2014.09); *A63F 13/69* (2014.09); *A63F 13/79* (2014.09); *A63F 13/355* (2014.09)

(58) Field of Classification Search
None
See application file for complete search history.

(56) References Cited

U.S. PATENT DOCUMENTS

2015/0251095 A1 9/2015 Perrin
2017/0182417 A1* 6/2017 Kogure ............... A63F 13/5372
2018/0207533 A1 7/2018 Anderson et al.

FOREIGN PATENT DOCUMENTS

CN 105327507 A 2/2016
CN 105867932 A 8/2016
(Continued)

OTHER PUBLICATIONS

Chinese Office Action issued in corresponding Chinese Patent Application No. 202210489667.7 dated Sep. 21, 2023, pp. 1-4.
(Continued)

*Primary Examiner* — Damon J Pierce
(74) *Attorney, Agent, or Firm* — PV IP PC; Wei Te Chung

(57) ABSTRACT

A cloud game starting method includes: displaying, by a terminal, a transaction interface for displaying information of one or more objects to be traded; generating a trial request for the one or more objects to be traded in response to a trial request operation for the one or more objects to be traded in the transaction interface; receiving a game interface corresponding to the trial request from a cloud game server, wherein the game interface includes a virtual scene and one or more virtual objects in the virtual scene respectively corresponding to the one or more objects; and receiving, by the terminal, a control instruction to control the one or more virtual objects to perform one or more game operations in the virtual scene.

11 Claims, 15 Drawing Sheets

(51) Int. Cl.

| | |
|---|---|
| ***A63F 13/77*** | (2014.01) |
| ***A63F 13/79*** | (2014.01) |
| *A63F 13/355* | (2014.01) |

(56) References Cited

FOREIGN PATENT DOCUMENTS

| | | | |
|---|---|---|---|
| CN | 106201877 | A | 12/2016 |
| CN | 108066986 | A | 5/2018 |
| CN | 111686450 | A | 9/2020 |
| CN | 112473131 | A | 3/2021 |
| CN | 112494934 | A | 3/2021 |
| CN | 112807678 | A | 5/2021 |
| CN | 112915537 | A | 6/2021 |
| CN | 114042310 | A | 2/2022 |
| CN | 114159773 | A | 3/2022 |
| CN | 114259734 | A | 4/2022 |
| CN | 114911558 | A | 8/2022 |
| JP | 2018171472 | A | 11/2018 |
| JP | 2021133131 | A | 9/2021 |
| WO | 2012153851 | A1 | 11/2012 |

OTHER PUBLICATIONS

International Search Report in International application No. PCT/CN2022/121462,mailed on Dec. 19, 2022.

Written Opinion of the International Search Authority in International application No. PCT/CN2022/121462,mailed on Dec. 19, 2022.

First Office Action issued from the Chinese application No. 202210489667.7, mailed on May 7, 2023.

* cited by examiner

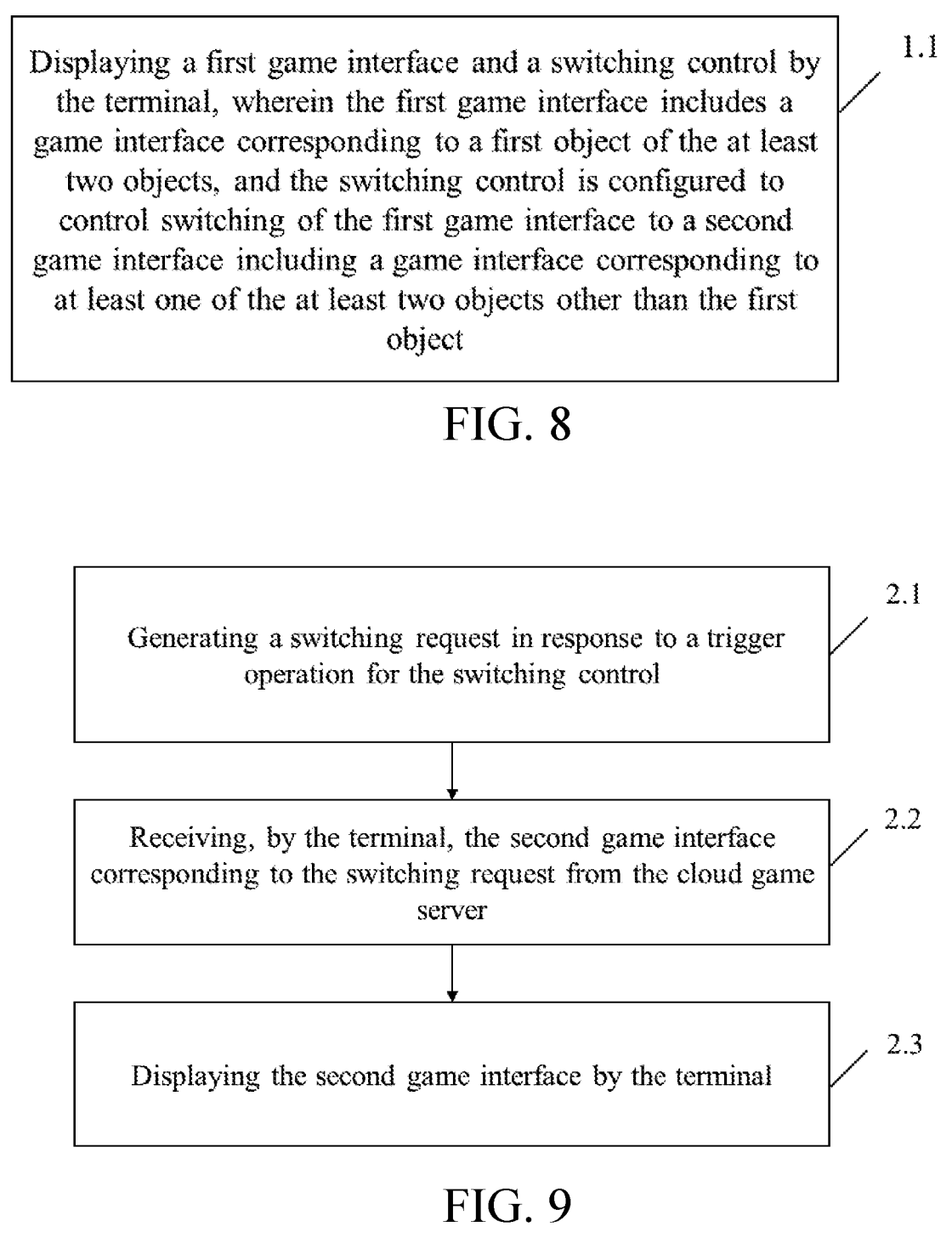

Displaying a first game interface and a switching control by the terminal, wherein the first game interface includes a game interface corresponding to a first object of the at least two objects, and the switching control is configured to control switching of the first game interface to a second game interface including a game interface corresponding to at least one of the at least two objects other than the first object — 1.1

FIG. 8

Generating a switching request in response to a trigger operation for the switching control — 2.1

↓

Receiving, by the terminal, the second game interface corresponding to the switching request from the cloud game server — 2.2

↓

Displaying the second game interface by the terminal — 2.3

FIG. 9

CLOUD GAME STARTING METHODS, APPARATUSES, AND SYSTEMS, COMPUTER DEVICE AND STORAGE MEDIA

CROSS REFERENCE TO RELATED APPLICATIONS

This application is a US National Phase Application of International Application No. PCT/CN2022/121462, filed on Sep. 26, 2022, which claims priority to Chinese Patent Application No. 202210489667.7, filed on May 6, 2022. The disclosures of the above applications are incorporated herein by reference in their entireties for all purposes.

TECHNICAL FIELD

The present disclosure relates to game technologies, and more particularly, to cloud game starting methods, apparatuses, and systems, computer devices, and storage media.

BACKGROUND

With the development of network games, there are more and more transactions of virtual characters, virtual props, or the like between game players. A game player may trade his/her own virtual characters, virtual props, or the like in a game with another player on a game transaction platform.

However, on the game transaction platform, information about an object to be traded can be displayed only in the form of words or pictures.

SUMMARY

According to a first aspect, the present disclosure provides a cloud game starting method, including: displaying, by a terminal, a transaction interface for displaying information of one or more objects to be traded; generating a trial request for the one or more objects to be traded in response to a trial request operation for the one or more objects to be traded in the transaction interface; receiving a game interface corresponding to the trial request from a cloud game server, wherein the game interface comprises a virtual scene and one or more virtual objects in the virtual scene respectively corresponding to the one or more objects to be traded, and the game interface comprises a picture corresponding to a video stream sent by the cloud game server, the video stream comprises stream data obtained by encoding a game picture by the cloud game server, and the game picture is generated by running a game program that is installed in the cloud game server and corresponds to the trial request; and receiving, by the terminal, a control instruction to control the one or more virtual objects to perform one or more game operations in the virtual scene.

According to a second aspect, the present disclosure further provides a cloud game starting method, including: receiving, by a target server, a trial request generated by a terminal, wherein the target server is one of a game server and or cloud game server, and the trial request is generated by the terminal in response to a trial request operation for one or more objects to be traded in a transaction interface displaying information of the one or more objects to be traded, the transaction interface being displayed by the terminal; generating, by the target server, target game data in response to the trial request; starting, by the cloud game server, a game program corresponding to the trial request; generating, by the cloud game server, a game interface corresponding to the trial request based on the target game data through the game program, wherein the game interface comprises a virtual scene and one or more virtual objects in the virtual scene respectively corresponding to the one or more objects to be traded, and the game interface comprises a picture corresponding to a video stream sent by the cloud game server, the video stream comprising stream data obtained by encoding a game picture by the cloud game server, the game picture being generated by running the game program installed in the cloud game server; and transmitting, by the cloud game server, the game interface corresponding to the trial request to the terminal.

According to a third aspect, the present disclosure further provides a non-transitory computer-readable storage medium storing a plurality of instructions executable by a processor to perform operations of the cloud game starting method of any one of embodiments of the present disclosure.

BRIEF DESCRIPTION OF THE DRAWINGS

FIG. 8 is a schematic flowchart of a method for displaying a first game interface corresponding to a first object according to one or more embodiments of the present disclosure.

FIG. 9 is a schematic flowchart of a method for switching display of the first game interface to display of a second interface corresponding to a second object according to one or more embodiments of the present disclosure.

DETAILED DESCRIPTION

Figure 1A:
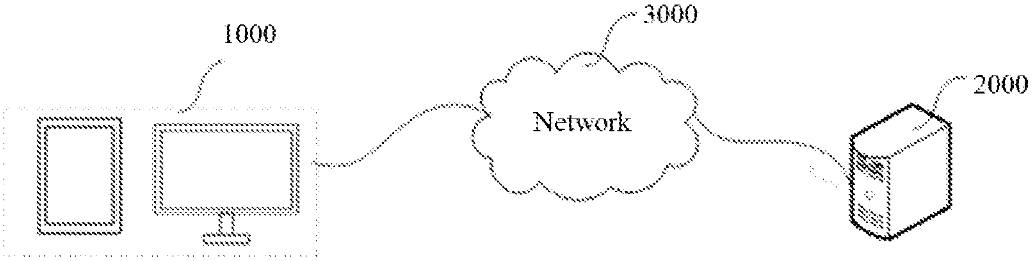
FIG. 1A is a schematic diagram of a scenario of a cloud game starting system according to one or more embodiments of the present disclosure.

Some embodiments of the present disclosure will be described in detail below in connection with the accompanying drawings. The embodiments are described for illustrative purposes only and are not intended to limit the present disclosure.

Before the embodiments of the present disclosure are explained in detail, some terms referred to in the embodiments of the present disclosure are explained.

A virtual scene is displayed (or provided) by a terminal when an application program runs on the terminal. The virtual scene may be an emulation environment for the real world, a semi-emulation-semi-fiction virtual environment, or a purely fictitious virtual environment. The virtual scene may be any one of a two-dimensional virtual scene, a two-and-half-dimensional virtual scene, or a three-dimensional virtual scene, and a dimension of the virtual scene is not limited in the embodiments of the present disclosure. For example, the virtual scene may include sky, land (including environmental elements such as deserts, cities, or the like), ocean, or the like. A user may control a virtual character to move in the virtual scene.

A virtual character refers to an object to be traded used to simulate a person or an animal in the virtual scene. The virtual character may be a virtual person, a virtual animal, an anime character, or the like, e.g., a person or an animal displayed in the virtual scene. The virtual character may be a virtual image in the virtual scene for representing the user. The virtual scene may include a plurality of virtual characters. Each of the plurality of virtual characters has its own shape and volume in the virtual scene, and occupies a part of space in the virtual scene. Activities of the virtual character may include: adjusting body posture, crawling, walking, running, riding, flying, jumping, aiming using a virtual sight, shooting, driving, picking, attacking, throwing, releasing skills, or the like.

In some embodiments, the virtual character may be a user role controlled through an operation on the terminal. In some embodiments, the virtual character may compete in the virtual scene. In some embodiments, a number of virtual characters involved in interaction in the virtual scene may be preset or may be dynamically determined according to a number of terminals joining the interaction.

A virtual prop can be used by the virtual character in the virtual scene. The virtual prop includes a virtual weapon (e.g., a pistol, a rifle, a sniper gun, a dagger, a knife, a sword, an axe, a rope) that can harm other virtual characters, a replenishing prop (e.g., a bullet), a defense prop (e.g., a shield, an armor, an armored vehicle), a virtual prop (e.g., a virtual light beam, a virtual shock wave) that is displayed by a hand of the virtual character when the virtual character releases a skill, and a therapeutic prop (e.g., a medicine bag, a beverage).

A game interface refers to an interface corresponding to an application program provided or displayed through a graphical user interface. The game interface includes a graphical user interface for user interaction and a game picture, the game picture being an image of the virtual scene.

In some embodiments, the game interface may include game controls (e.g., skill controls, behaviour controls, function controls), indication indicia (e.g., direction indication indicia, character indication indicia), information display regions (e.g., a number of kills, game time), or game settings controls (e.g., system settings, stores, gold coins).

A cloud game refers to a game mode based on cloud computing. In an operation mode of the cloud game, an operation subject of a game program and a display subject of the game picture are separated, storage and operation of a character control method are performed on a cloud game server, and the terminal is used to receive and transmit data and display the game picture. For example, the terminal may be a display device having a data transmission function near a user side, such as a television, a computer, or a palmtop computer. However, a character control device is the cloud game server in the cloud. When playing the cloud game, the user operates the terminal to send an operation instruction (e.g., an operation instruction of a touch operation) to the cloud game server. The cloud game server operates the cloud game according to the operation instruction, encodes and compresses data (e.g., the game picture), and returns the data to the terminal through a network, and finally the terminal decodes the data and outputs the game picture. The cloud game may be a home game, a palmtop game, an arcade game, a cell phone game, etc.

Embodiments of the present disclosure provide cloud game starting methods, cloud game starting apparatuses, cloud game starting systems, computer devices, and storage media.

The cloud game starting apparatuses may be specifically integrated in an electronic device, which may be a terminal, a server, or the like. The terminal may be a device such as a mobile phone, a tablet computer, a Bluetooth smart device, a notebook computer, or a Personal Computer (PC). The server may be a single server or a server cluster including a plurality of servers.

In some embodiments, the cloud game starting apparatuses may also be integrated in a plurality of electronic devices, for example, the cloud game starting apparatus may be integrated in a plurality of servers to implement the cloud game starting methods of the present disclosure by the plurality of servers.

In some embodiments, the terminal may be a local terminal device. Taking a game as an example, the local terminal device stores a game program and is used to display a game picture. The local terminal device is used to interact with a user through a graphical user interface. The local terminal device may provide the graphical user interface to the user through a plurality of ways. For example, the graphical user interface may be rendered and displayed on a display screen of the terminal, or provided to the user through holographic projection. For example, the local terminal device may include a display screen and a processor. The display screen is used to display the graphical user interface including the game picture. The processor is used to run the game, generate the graphical user interface, and control displaying of the graphical user interface on the display screen. The user can operate on the interface through an input device such as a touch screen, a mouse, a keyboard, or a handle.

In some embodiments, the server may also be implemented in a form of the terminal.

For example, referring to FIG. 1A, FIG. 1A provides a schematic diagram of a scenario of a cloud game starting system according to some embodiments. The cloud game starting system may implement cloud game starting methods. The cloud game starting system may include a terminal 1000, a cloud game server 2000, and a network 3000 through which the terminal and the server may exchange data.

The terminal 1000 is configured to: display, a transaction interface for displaying information of one or more objects to be traded; generate a trial request for the one or more objects to be traded in response to a trial request operation for the one or more objects to be traded in the transaction interface; receive a game interface corresponding to the trial request sent by the cloud game server 2000, wherein the game interface includes a virtual scene and one or more virtual objects in the virtual scene respectively corresponding to the one or more objects, and includes a picture corresponding to a video stream sent by the cloud game server, the video stream includes stream data obtained by encoding a game picture by the cloud game server, the game picture being generated by running a game program that is installed in the cloud game server and corresponds to the trial request; and receive a control instruction to control the one or more virtual objects to perform one or more game operations in the virtual scene.

Detailed descriptions are provided below. It will be appreciated that specific embodiments of the present disclosure relate to information relating to the one or more objects, user information, identification information, virtual character information, and virtual props information, data relating to the trial request operation and a trigger operation, or the like. When these embodiments of the present disclosure are applied to a certain product or technology, user permission or consent is required, and collection, use, and processing of the related data needs to comply with relevant laws, regulations, and standards of relevant countries and regions.

Figure 1B:
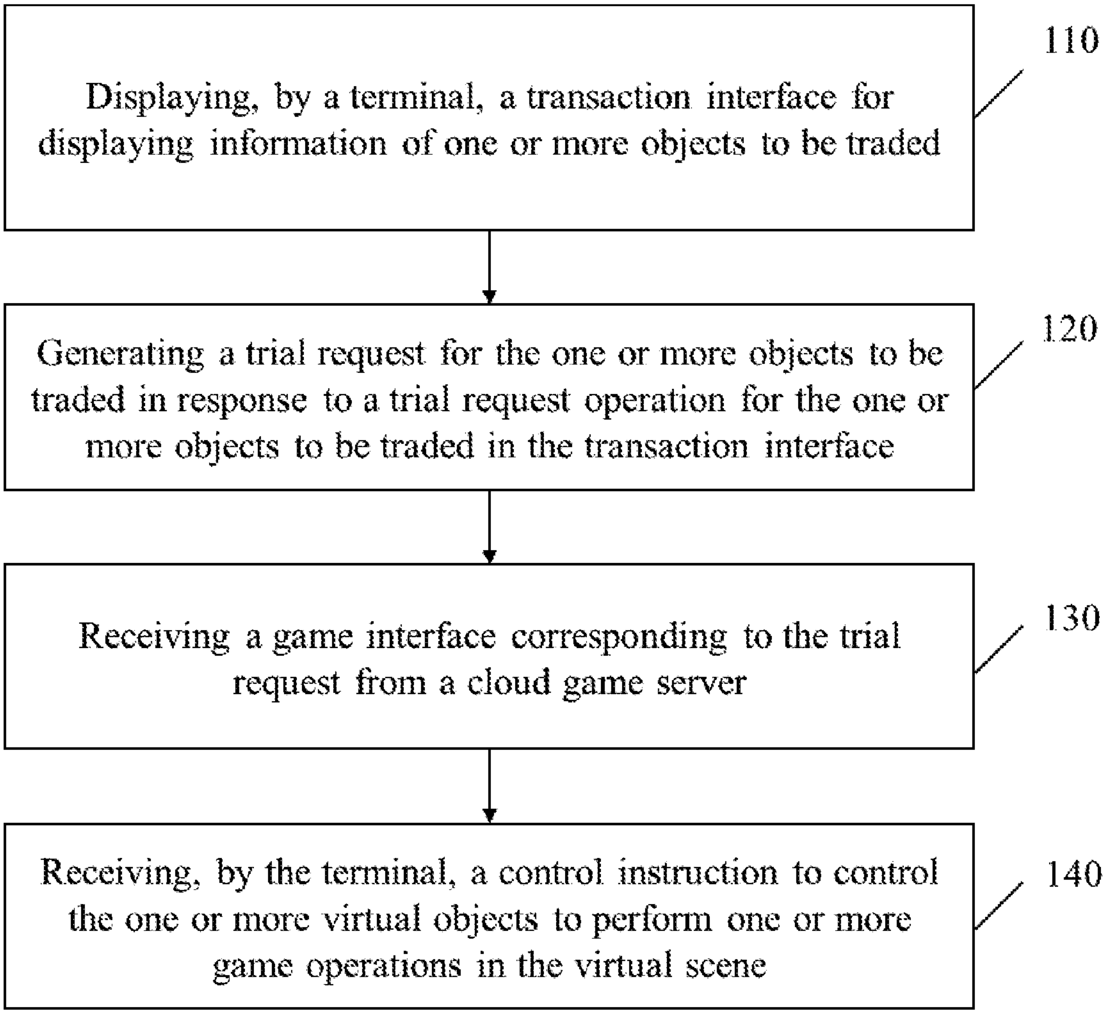
FIG. 1B is a schematic flowchart of a cloud game starting method according to one or more embodiments of the present disclosure.

In one or more embodiments, a cloud game starting method is provided. As shown in FIG. 1B, a specific flow thereof may be as below.

In 110: a transaction interface for displaying information of one or more objects to be traded is displayed by a terminal.

Figure 1C:
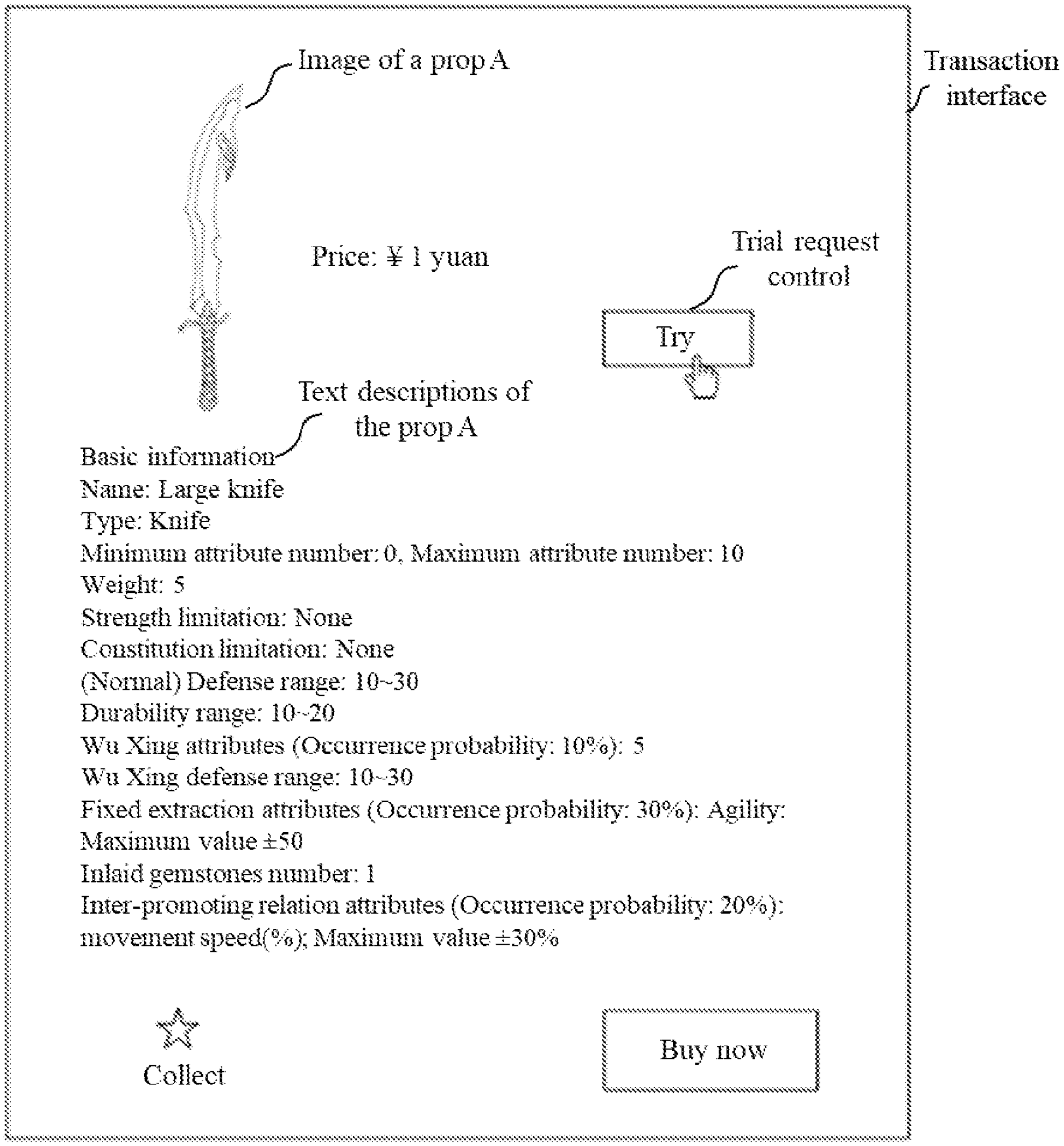
FIG. 1C is a schematic diagram of a transaction interface according to one or more embodiments of the present disclosure.

The transaction interface may be an interface generated according to pages such as a preloaded hypertext markup language 5 (HTML5), an active server page (ASP), and a hypertext preprocessor (PHP). The transaction interface may be a web page interface, an interface displayed by an application program, or the like, which may be set according to an application scenario. For example, a game transaction platform may be displayed in a web page, wherein text and/or image information of a plurality of objects to be traded may be displayed through a host page of a website of the game transaction platform; or an application program of the game transaction platform may be installed in the terminal, wherein the text and/or image information of the plurality of objects to be traded may be displayed after the application program is opened. When the text and/or image information of any one of the objects to be traded is clicked, a transaction interface corresponding to the object to be traded may be skipped to. The information of the one or more objects to be traded displayed by the transaction interface may include images and text descriptions (including but not limited to information such as grades, fight force, attributes, pricing, or the like of the one or more objects) of the one or more objects. As shown in FIG. 1C, FIG. 1C is a transaction page of a prop A (a large knife) in a game, and the transaction page shows an image, a text description, and a price of the prop A.

As used herein, an object to be traded refers to a virtual asset owned by a game player that can be traded in the game. For example, the object to be traded may be a virtual character, a virtual prop, or the like. For example, if the object to be traded is a character, a virtual object is the virtual character; or if the object to be traded is a non-character, the virtual object is the virtual prop, which is configured on a default virtual character, such as a preset virtual character or a virtual character corresponding to the game player.

In 120: a trial request for the one or more objects to be traded is generated in response to a trial request operation for the one or more objects to be traded in the transaction interface.

The trial request operation refers to an operation for the one or more objects. The trial request operation may be an operation for the information of the one or more objects in the transaction interface. For example, an instruction for generating the trial request may be triggered by clicking the image or text information of the one or more objects to be traded in the transaction page, or by operating another preset control in the transaction interface. For example, the transaction interface may further include a trial request control, and the trial request may be generated by operating the trial request control. The trial request operation may include, but is not limited to, a touch, a drag, a stroke, a long press, a short press, double clicks, a single click, an end drag, or the like. A user can perform the trial request operation through an input device such as a touch screen, a mouse, a keyboard, or a handle, depending on a game operation method or a game specific setting. As shown in FIG. 1C, the transaction interface displays the trial request control corresponding to the prop A, by clicking which a trial request of the prop A can be generated. It should be noted that the operation 120 may be performed in the terminal, a transaction server, a target server, or a cloud game server. For example, the trial request operation may be sent to the transaction server, the target server, or the cloud game server, and the trial request may be generated by the transaction server, the target server, or the cloud game server. The terminal may generate the trial request and send the trial request to the transaction server, the target server, or the cloud game server. As another example the transaction server and the target server may be deployed in the cloud game server.

In some embodiments, when the transaction interface displays information of a plurality of objects, the trial request operation may aim at one or more of the plurality of objects. For example, at least one object to be traded may be selected by an operation for the information of the one or more objects to be traded, and a trial request for all the selected object(s) may be generated by an operation for the trial request control displayed in the transaction interface. When a plurality of objects to be traded are selected, the generated trial request is for the plurality of objects, and a trial order of the plurality of objects to be traded may be determined according to a selected order of the plurality of objects.

The trial request refers to information for requesting to try the one or more objects. In some embodiments, to enable the cloud game server to start a corresponding game program, the trial request may include the information of the one or more objects to be traded (e.g., identification information of the one or more objects), may further include user information of a user that is to log in the transaction page, identification information of a game corresponding to the one or more objects, or the like, and may further be information that is generated based on one or more pieces of the above information and can be used to start the corresponding game program.

In some embodiments, to reduce a load of the cloud game server and improve data processing and transmission efficiencies between the cloud game server and the terminal, the trial request may include a starting instruction of the game program corresponding to the one or more objects, and the operation 120 may include: in response to the trial request operation for the one or more objects to be traded in the transaction interface, generating the starting instruction of the game program corresponding to the one or more objects to be traded based on transaction information of the one or more objects. Thus, the cloud game server may start the corresponding game program according to the starting instruction. Each game program may be a cloud game process.

In some embodiments, the terminal may generate the trial request based on the trial request operation, and send the trial request to the cloud game server. After receiving the trial request, the cloud game server may start a cloud game process corresponding to the one or more objects to be traded based on information carried in the trial request to run a corresponding game program. For example, under the circumstances that the trial request may include the information of the one or more objects to be traded and a plurality of cloud game programs may be mounted in the cloud game server, after receiving the trial request, the cloud game server may determine the cloud game program corresponding to the one or more objects to be traded based on the information of the one or more objects, and create the corresponding cloud game process to run the cloud game program. Since transactions between game players are based on existing virtual characters or virtual props in the game, data of the one or more objects to be traded in the game is also stored in the cloud game server or can be retrieved by the cloud game server, so that the data of the one or more objects to be traded in the game can be obtained from the cloud game server based on the information of the one or more objects, and can be processed using the game program run by the cloud game process to generate a virtual scene corresponding to the one or more objects to be traded to be processed. The virtual scene is transmitted to the terminal in a form of game interface data.

A game interface may include a game picture, a graphical user interface for user interaction, and the like. A game interface corresponding to the trial request may include the one or more objects. For example, the game interface may display the one or more objects, and the one or more objects to be traded may be a virtual character operated by the current user, a virtual prop assembled for the virtual character operated by the current user, or a displayed virtual prop that can be picked up. The game interface corresponding to the trial request may further include a preset object to be traded for obtaining the one or more object. For example, the preset object to be traded may include but is not limited to an item bar, an equipment bar, a store, or a non-player character (NPC). The user may interact with the preset object to be traded displayed in the game interface to obtain the one or more objects, for example, obtaining a wearable equipment by clicking the NPC and trading with the NPC. In this case, the data of the one or more objects to be traded may be stored in the cloud game server, and a game picture including a virtual character that wears the equipment may be generated at the cloud game server in response to a click operation and a transaction operation of the user.

In 130: the game interface corresponding to the trial request is received from the cloud game server.

The game interface includes a virtual scene and one or more virtual objects in the virtual scene respectively corresponding to the one or more objects. The game interface is a picture corresponding to a video stream sent by the cloud game server. The video stream includes stream data obtained by encoding a game picture by the cloud game server, the game picture being generated by running a game program that is installed in the cloud game server and corresponds to the trial request.

After the trial request is generated, the cloud game server may generate the corresponding game picture based on the trial request and send the game picture to the terminal in the form of the video stream. The terminal may display the game picture based on received video stream data. A control connection link may be established, through which the user can operate a cloud game at the terminal, and the cloud game server may receive game operation information of the user at the terminal and adjust the game interface data in real time. It should be noted that the operation 130 may be performed in the terminal, the transaction server, or the target server. For example, the game interface corresponding to the trial request may be received by the transaction server or the target server and forwarded to the terminal.

In some embodiments, when the trial request corresponds to at least two objects to be traded of the one or more objects, after the operation 130, the method may further include an operation 1.1 as shown in FIG. 8, as below:

in 1.1, displaying a first game interface and a switching control by the terminal, wherein the first game interface includes a game interface corresponding to a first object to be traded of the at least two objects, and the switching control is configured to control switching of the first game interface to a second game interface including a game interface corresponding to at least one of the at least two objects to be traded other than the first object.

The switching control may be a control configured to switch the first game interface to the second game interface. A switching order of the switching control may be any order, or may be a selected order of the at least two objects to be traded in the transaction interface.

The first object to be traded may be an object at the top of the selected order of the at least two objects to be traded in the transaction interface, or may be any one of the at least two objects. The second object to be traded may be any one of the at least two objects to be traded other than the first object, or may be a next object of the top one of the selected order of the at least two objects to be traded in the transaction interface.

The first game interface is a game interface generated based on a video stream of a game interface corresponding to the first object to be traded sent by the cloud game server. The second game interface is a game interface generated based on a video stream of a game interface corresponding to the second object to be traded sent by the cloud game server.

When the user selects a plurality of objects to be traded at the transaction interface, a trial request corresponding to the plurality of objects to be traded may be generated, that is, the trial request may be used to try the plurality of objects. Upon receiving the trial request, the cloud game server may start a cloud game process corresponding to one or more of the plurality of objects, thereby generating one or more game interfaces. However, to reduce a load of the terminal and improve a data processing efficiency, a game interface (i.e., the first game interface) of only one (i.e., the first object) of the objects to be traded may be displayed at the terminal, and the user can flexibly switch to and try different objects to be traded through switching game interfaces. This supports trying virtual characters of a plurality of trial games in the transaction interfaces, and provides a diversified manner for displaying the objects to be traded before a transaction.

In some embodiments, after the operation 1.1, the method further includes operations 2.1~2.3 as shown in FIG. 9, as below:

in 2.1, generating a switching request in response to a trigger operation for the switching control;

in 2.2, receiving, by the terminal, the second game interface corresponding to the switching request from the cloud game server; and in 2.3, displaying the second game interface by the terminal.

The trigger operation may include, but is not limited to, operations such as a touch, a drag, a stroke, a long press, a short press, double clicks, a single click, an end drag, or the like. The user can perform the trigger operation through an input device such as a touch screen, a mouse, a keyboard, or a handle, depending on the game operation method or the game specific setting.

The cloud game server may start only a game program corresponding to one object to be traded (that is, the first object) corresponding to the trial request, and thus the cloud game server and the terminal only need to process game data corresponding to the one object. For example, after the user triggers the switching control, the terminal may send the switching request to the cloud game server, and the cloud game server may start a game program corresponding to another one object to be traded based on the switching request, so that the user can flexibly switch to and try different objects. Since the cloud game server processes game data corresponding to only one object to be traded each time and the terminal also receives and displays a game interface corresponding to the only one object, the load of the cloud game server and the terminal is reduced while the diversified manner for displaying the objects to be traded is provided, thereby improving data processing and transmission efficiencies.

Figure 10:
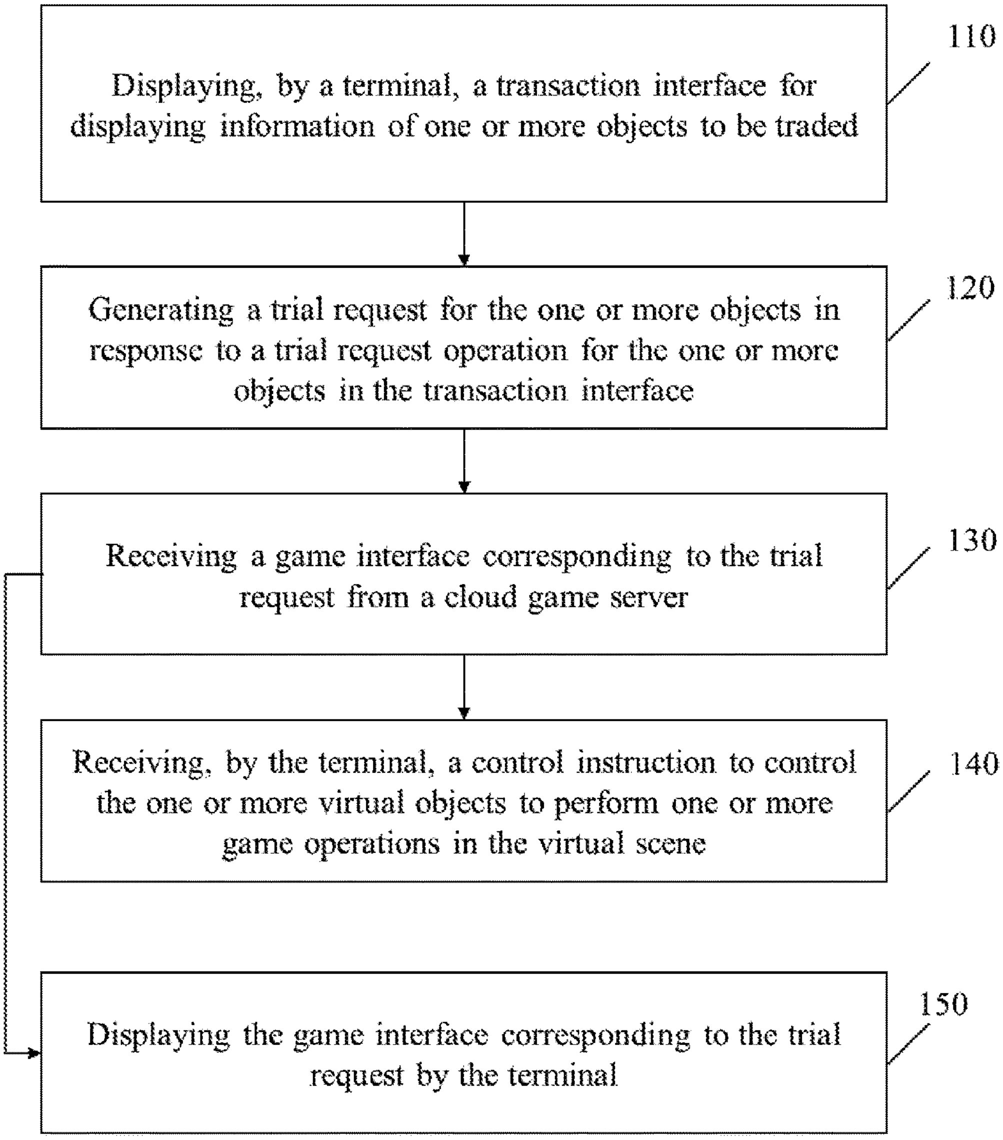
FIG. 10 is a schematic diagram of another cloud game starting system according to one or more embodiments of the present disclosure.

In some embodiments, referring to FIG. 10, after the operation 130, the method may further include an operation 150: displaying the game interface corresponding to the trial request by the terminal.

Figure 11:
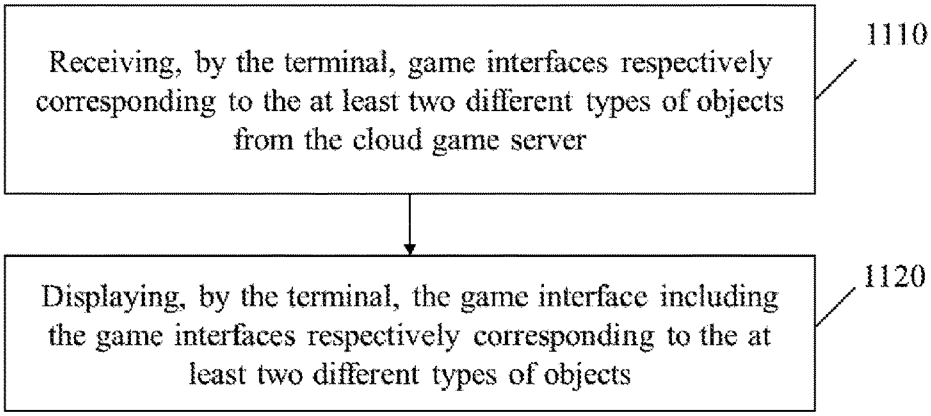
FIG. 11 is a schematic flowchart of a method for displaying a game interface corresponding to a trial request by a terminal according to one or more embodiments of the present disclosure.

In some embodiments, referring to FIG. 11, the trial request corresponds to at least two different types of objects to be traded of the one or more objects, and the displaying of the game interface corresponding to the trial request by the terminal may include: in 110, receiving, by the terminal, game interfaces respectively corresponding to the at least two different types of objects to be traded from the cloud game server; and in 120, displaying, by the terminal, the game interface comprising the game interfaces respectively corresponding to the at least two different types of objects to be traded.

Types of the one or more objects to be traded are used to represent attribute information corresponding to different objects to be traded that can be assembled or used at the same time. The types of the objects to be traded may include, but are not limited to, virtual characters, head guards, leg guards, hand-held props, backpacks, mounts, or the like. Different parts of a virtual character in the game may be equipped with a plurality of different types of virtual props, or the virtual character may use different virtual props through behaviours such as shouldering and riding, so that the user may try the virtual character and the plurality of different types of virtual props at the same time.

When performing the trial request operation, the user may select a plurality of different types of objects to be traded and generate a trial request for the plurality of different types of objects. The cloud game server may generate a game interface corresponding to the plurality of different types of objects to be traded based on the trial request, and transmit data of the game interface to the terminal. For example, the user clicks shoes, a headscarf, and an armor in the transaction interface and generates a trial request for the shoes, the headscarf, and the armor. After receiving the trial request, the cloud game server may obtain scene data, virtual character-A data corresponding to a current account, and data relating to the shoes, the headscarf, and the armor. The scene data includes at least one NPC. Data of one of the at least one NPC is correlated with the data of the shoes, the headscarf, and the armor to represent that the shoes, the headscarf, and the armor are placed on the NPC. The cloud game server generates a game picture including the NPC and the virtual character-A, and sends data of the game picture to the terminal. The terminal receives the data of the game picture and displays the game picture including the NPC and the virtual character-A. At this time, the user can operate the virtual character-A to interact with the NPC at the terminal, so that the virtual character-A may obtain and wear the shoes, the headscarf, and the armor. In this way, the user can operate the virtual character-A to try the shoes, the headscarf, and the armor. By generating the trial request for the plurality of different types of objects, a game picture including the plurality of different types of objects to be traded may be obtained and generated at one time, which may allow a player to try a combination of the different types of objects to be traded and provide the diversified manner for displaying the objects to be traded before a transaction.

In some embodiments, to facilitate a user to freely combine the selected plurality of different types of objects, and to provide the diversified manner for displaying the objects to be traded before the transaction, the game interface data corresponding to the objects to be traded may be data used to obtain the objects, such as display data of the preset object to be traded that can be used to obtain the objects. The preset object to be traded may include but is not limited to an item bar, an equipment bar, a store, or an NPC. The user may interact with the preset object to be traded displayed in the game interface to obtain the objects, for example, obtaining one or more objects to be traded by clicking and interacting with the NPC. To facilitate interaction of the virtual character with the NPC, the virtual character may be generated in the vicinity of the NPC, so that the virtual character and the NPC can be displayed in a same game picture.

It should be noted that, if any two of a plurality of objects to be traded that the user wants to try are of a same type, a trial request may be generated for the plurality of objects, and data of the plurality of objects to be traded may be correlated with the preset object, so that the user may obtain any plurality of different types of objects to be traded among the plurality of objects to be traded by interacting with the preset object, combine these obtained objects, and try the combined objects.

Figure 12:
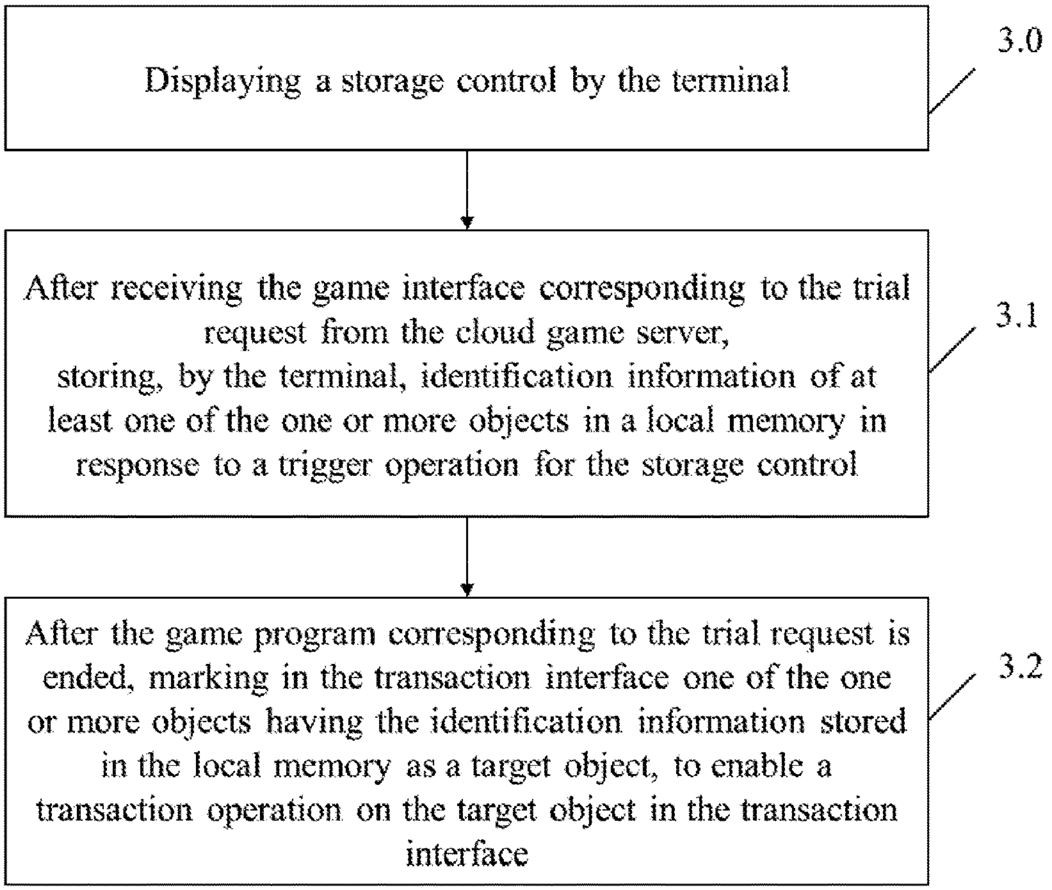
FIG. 12 is a schematic flowchart of a method for determining a target object to be traded according to one or more embodiments of the present disclosure.

In some embodiments, referring to FIG. 12, the terminal also displays a storage control, and the method may further include operations 3.1~3.2 after the operation 130, as below:

in 3.1, storing, by the terminal, identification information of at least one object to be traded of the one or more objects to be traded in a local memory in response to a trigger operation for the storage control; and in 3.2, after the game program corresponding to the trial request is ended, marking in the transaction interface one of the one or more objects to be traded having the identification information stored in the local memory as a target object to be traded to enable a transaction operation on the target object to be traded in the transaction interface, wherein the target object to be traded is an object to be traded corresponding to the identification information stored in the local memory.

The storage control is used to store identification information of an object. The trigger operation may include, but is not limited to, a touch, a drag, a stroke, a long press, a short press, double clicks, a single click, an end drag, or the like. The user can perform the trial request operation through an input device such as a touch screen, a mouse, a keyboard, or a handle, depending on the game operation method or the game specific setting. The trigger operations in the operation 2.1 and the operation 3.1 may be same or different, depending on the game operation method or the game specific setting.

After the storage control is triggered, the identification information of the object to be traded may be obtained from game data of the trial request or the game program and may be stored in the local memory. Since the game program generally obtains data of the one or more objects to be traded in the game server before generating the game interface data, the game interface data may include identification information of the one or more objects. When the user ends the game program corresponding to the one or more objects, it may be considered that the user has finished trying the one or more objects. In such case, if the local memory stores identification information of the object, the object to be traded is considered as an object to be traded of interest to the user. The terminal or the transaction server may compare the identification information of the at least one object to be traded stored in the local memory and the identification information of the one or more objects to be traded displayed in the transaction interface. If the identification information of the at least one object to be traded stored in the local memory matches identification information of one of the one or more objects to be traded displayed in the transaction interface, the terminal or the transaction server may mark the one of the one or more objects as the target object to be traded through a marking form, which may be highlighting, adding a specific region (e.g., a shopping cart) in the transaction interface, etc. As a result, when the user tries an object to be traded, if the user wants to purchase the object, identification information of the object can be saved through the trigger operation for the storage control. Moreover, the identification information is stored locally rather than being synchronously stored in a server, which improves a data storage efficiency and reduces the load of the cloud game server.

In 140: a control instruction to control the one or more virtual objects to perform one or more game operations is received by the terminal in the virtual scene.

After receiving the video stream from the cloud game server, the terminal may render the video stream on a graphical user interface of the terminal in real time to display the game interface. The user may execute an operation at the terminal, generate the control instruction, and control the virtual object to execute the corresponding game operation, so as to try the one or more objects to be traded through the game interface displayed by the terminal.

The game operation refers to an operation preset to control a virtual character to execute a preset virtual action. The preset operation may include, but is not limited to, operations such as a touch, a drag, a stroke, a long press, a short press, double clicks, a single click, an end drag, or the like. The user can perform the game operation through an input device such as a touch screen, a mouse, a keyboard, or a handle, depending on the game operation method or the game specific setting. For example, when the one or more objects to be traded is a virtual character, the preset virtual action may be adjusting a body posture, crawling, walking, running, riding, flying, jumping, aiming using a virtual sight, shooting, driving, picking, attacking, throwing, releasing skills, or the like. When the one or more objects to be traded is a virtual prop, the game operation may be an operation for the virtual prop, e.g., moving, picking, discarding, synthesizing, forging, and using the virtual prop. A specific virtual action depends on the game operation method or the game specific setting.

The cloud game starting method provided by some embodiments of the present disclosure can be applied to various scenarios (e.g., a multi-player competitive game) of a game virtual asset transaction. The cloud game starting method may include: displaying, by a terminal, a transaction interface for displaying information of one or more objects to be traded; generating a trial request for the one or more objects to be traded in response to a trial request operation for the one or more objects to be traded in the transaction interface;

receiving a game interface corresponding to the trial request from a cloud game server; and receiving, by the terminal, a control instruction to control the one or more virtual objects to perform one or more game operations in the virtual scene. Through the cloud game starting method provided by the embodiments of the present disclosure, the game program corresponding to the trial request may be started based on the trial request operation of the user on the transaction interface, and a diversified manner for displaying the one or more objects to be traded before a transaction is provided.

In addition, some embodiments of the present disclosure can also provide a switching control in the game interface. When the user selects a plurality of objects to be traded in the transaction interface, the user may flexibly switch to and try different objects to be traded by a trigger operation for the switching control, to support trying virtual characters of a plurality of trial games in the transaction interface and provide the diversified manner for displaying the objects to be traded before the transaction. Some embodiments of the present disclosure may further provide a storage control on the game interface for saving identification information of an object, and the identification information is stored locally rather than being synchronously stored in a server, thereby improving a data storage efficiency and reducing a load of the cloud game server.

As can be seen from the above, the embodiments of the present disclosure may provide the user with various ways for displaying and trying the one or more objects before a transaction.

Figure 2:
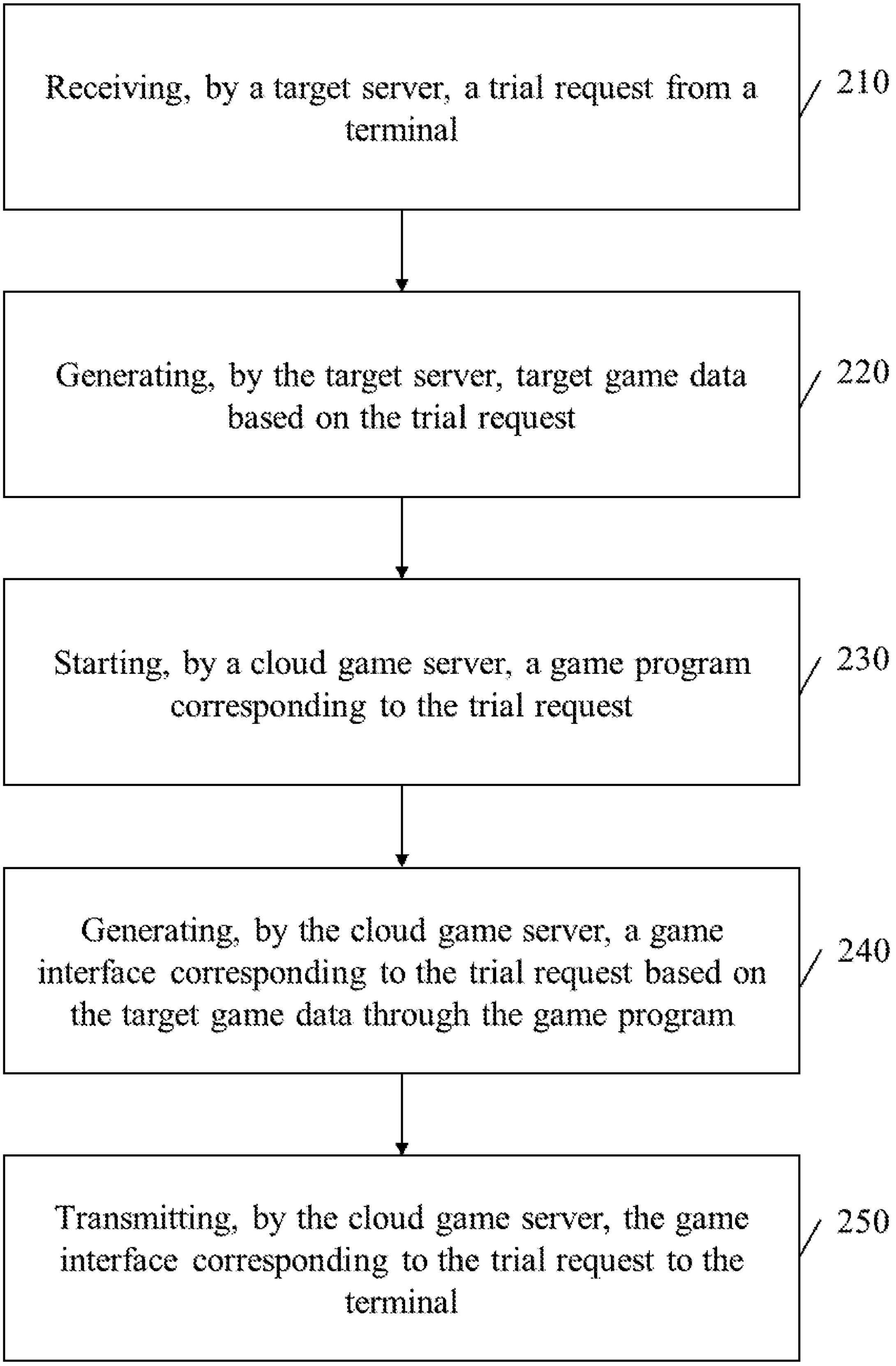
FIG. 2 is a schematic flowchart of a cloud game starting method according to one or more embodiments of the present disclosure.

In one or more embodiments, a cloud game starting method is provided. As shown in FIG. 2, a specific flow may be as below.

In 210: receiving, by a target server, a trial request from a terminal.

The target server is a game server or a cloud game server. The terminal displays a transaction interface for displaying information of one or more objects to be traded. The trial request is generated in response to a trial request operation for the one or more objects to be traded in the transaction interface.

The game server may be used to store game data and generate game data required by a game program in the cloud game server based on the stored game data. The stored game data may include, but is not limited to, virtual scenes, virtual characters, virtual props, user history game data, game accounts, or the like, which enable a user to log in and execute a game operation.

Figure 19:
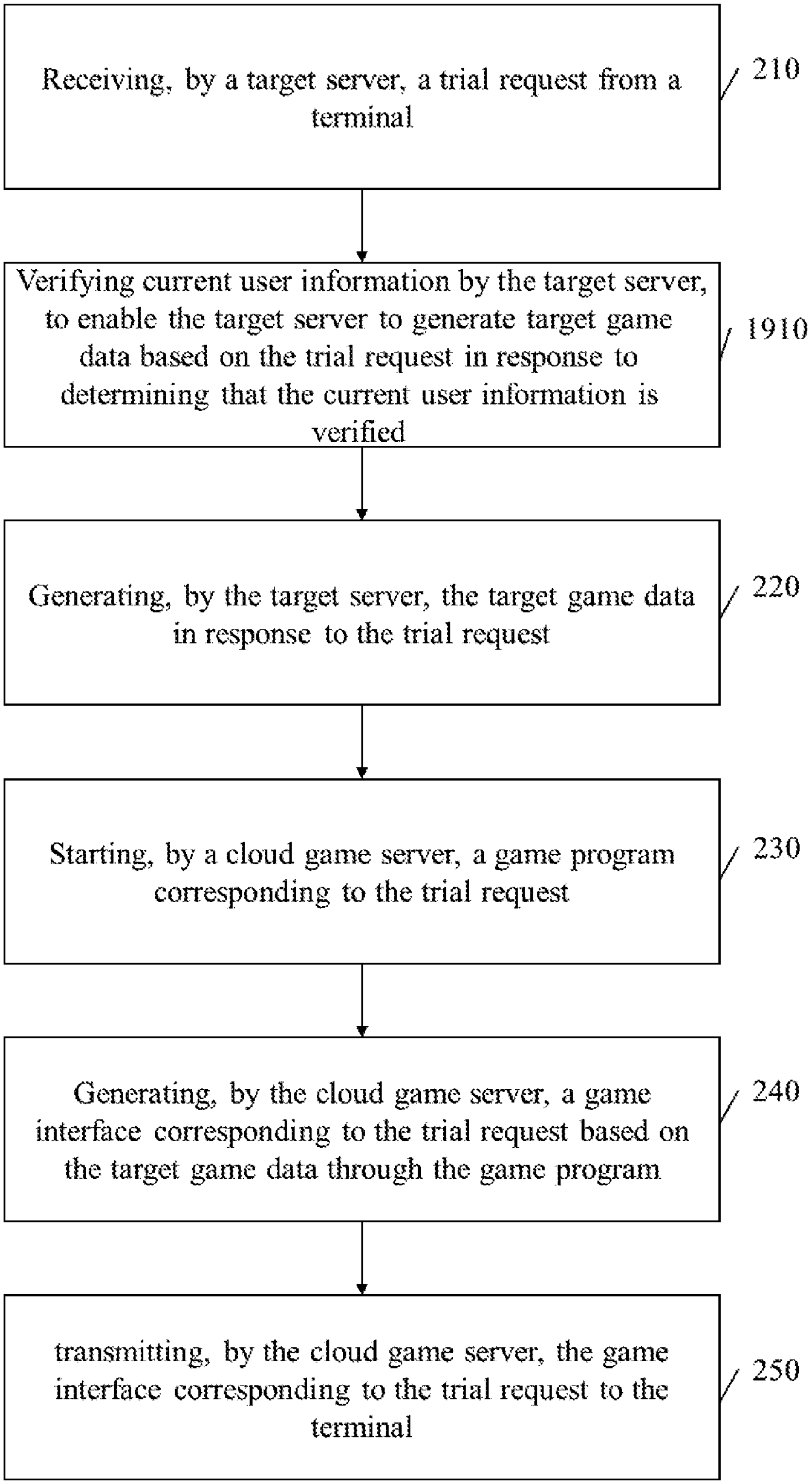
FIG. 19 is a schematic flowchart of another cloud game starting method according to one or more embodiments of the present disclosure.
Figure 20:
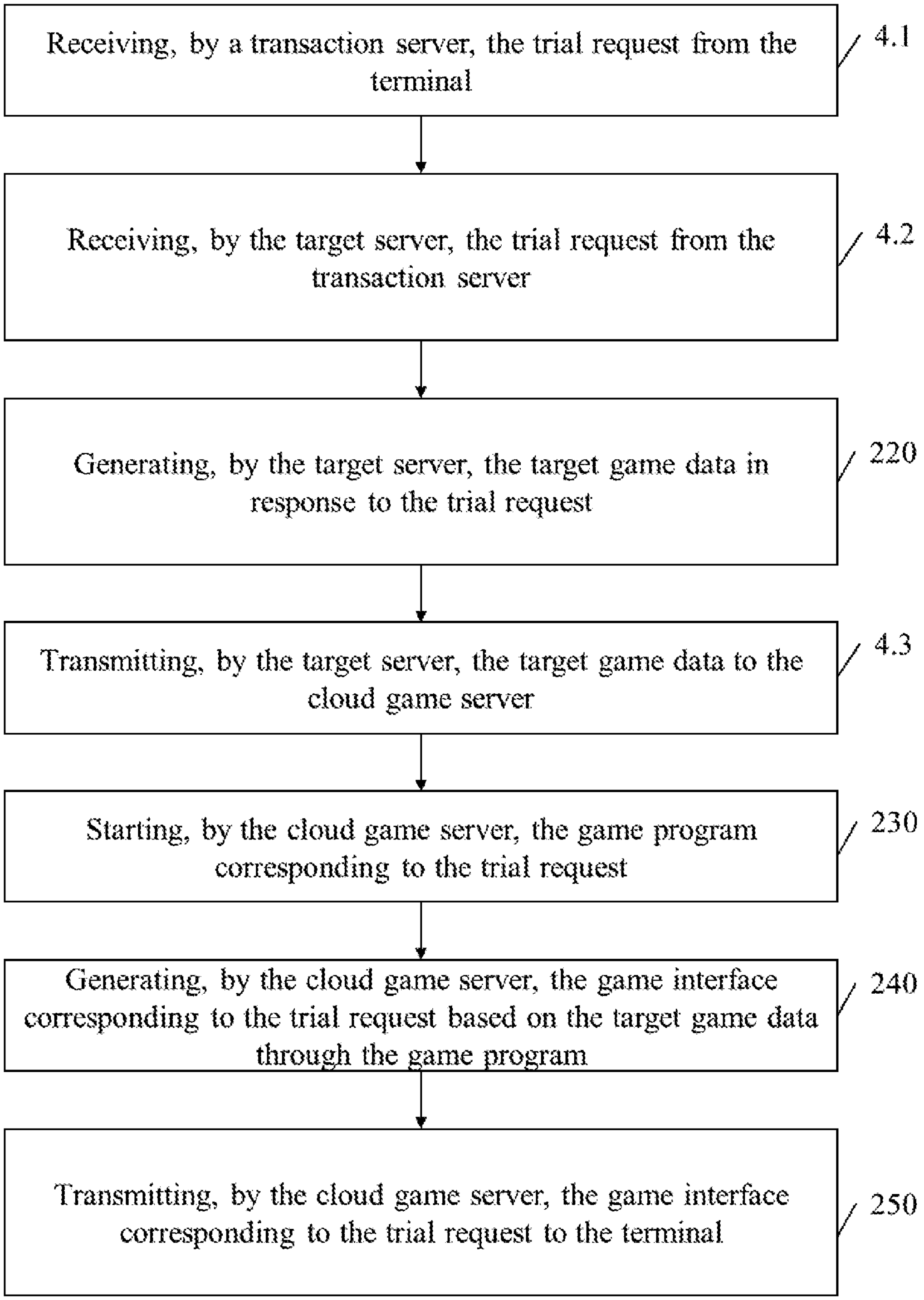
FIG. 20 is a schematic flowchart of still another cloud game starting method according to one or more embodiments of the present disclosure.

In some embodiments, the trial request includes current user information and identification information of the one or more objects. Referring to FIG. 19, between the operations 210 and 220, the method may further include an operation 1910, as below:

- in 1910: verifying the current user information by the target server, to enable the target server to generate the target game data based on the trial request in response to determining that the current user information is verified.

The current user information refers to information of a user who logs in the transaction interface, and may be account information of the user who logs in the transaction interface or identification information of the user, and may represent an identity of the user who logs in the transaction interface.

The identification information of the one or more objects to be traded refers to identification information that can be used to identify the one or more object, for example, identification information of the one or more objects to be traded in a game. Generally, the identification information of an object to be traded of the one or more objects to be traded in the game is unique, and can be used to distinguish the object to be traded from other virtual assets in the game. In some embodiments, to quickly determine a game which the object to be traded belongs to from the identification information of the object, the identification information of the object to be traded may further include an identification of the game which the object to be traded belongs to. For example, the identification information of a certain object to be traded may be identified as MHXY13311, wherein MHXY represents an abbreviation of the game which the object to be traded belongs to, and 13311 is a code of the object to be traded in the game.

In order to enable the virtual characters or virtual props purchased by the user at a game transaction platform to be directly bound in a game account of the user, the game transaction platform and the game are often strongly associated. For example, the user may log in the game transaction platform and the game with a same account, or the game transaction platform and the game may store a corresponding relationship between a game transaction platform login account and a game login account. Therefore, the trial request from the terminal can simultaneously carry the current user information, so that the target server can obtain the current user information from the terminal and verify the identity of the current user before the cloud game server starts a game program, so that the cloud game server can only start a cloud game process for a verified user, thereby reducing a load of the cloud game server. For example, when receiving the current user information, the game server may determine whether game account information stored in the game server includes a game account corresponding to the current user information. If the game account information stored in the game server includes the game account corresponding to the current user information, the current user information is considered to be verified, and the cloud game server may start a corresponding game program for the user, so that the user can try a virtual character to be traded. If the current user information fails to pass the verification, a prompt indicating that the verification fails or the object(s) cannot be tried is displayed on the transaction interface. It should be noted that in determining whether the game account information stored in the game server includes the game account corresponding to the current user information, a corresponding game may be determined based on the identification information of the one or more objects, stored game accounts of the corresponding game may be obtained from the game server, whether the obtained game accounts include the game account corresponding to the current user information is determined, and if so, the current user information passes the verification. In this way, the cloud game server may be avoided being called frequently, thereby reducing the load of the cloud game server.

In some embodiments, when the trial request operation is an operation for one or more objects, the cloud game server may start a cloud game process corresponding to a first object to be traded of the one or more objects to be traded for the terminal based on the trial request after receiving the trial request, run a game program in the cloud game process to generate a game interface corresponding to the first object, and send the game interface corresponding to the first object to be traded to the terminal to display the game interface corresponding to the first object to be traded at the terminal. The first object to be traded may be an object to be traded that is at the top of a selected order of the one or more objects to be traded in the transaction interface, or may be any one of the one or more objects.

In some embodiments, the operation 210 may further include operations 4.1~4.2, as below:

- in 4.1, receiving, by a transaction server, the trial request from the terminal; and in 4.2, receiving, by the target server, the trial request from the transaction server.

Between the operations 210 and 240, the method may further include an operation 4.3, as below:

in 4.3, transmitting, by the target server, the target game data to the cloud game server.

The transaction server may refer to a server corresponding to the transaction interface. For example, a client of a transaction platform may be installed in the terminal, and may display the transaction interface and initiate trial request logic. The transaction server may provide a service for the client of the transaction platform to complete various transaction interfaces.

After the terminal generates the trial request, the trial request may be sent to the transaction server. The transaction server may forward the trial request to the game serve. The game server may generate the target game data based on the trial request, and send the target game data to the cloud game server. In this way, an interaction process from the transaction interface to the game interface is realized, and the diversified manner for displaying the one or more objects to be traded before a transaction is provided. It should be noted that when the trial request is transmitted between the terminal, the transaction server, the game server, and the cloud game server, a transmission form of the trial request and content carried in different transmission processes may be different. When the game server sends the target game data to the cloud game server, the game server may send the trial request to the cloud game server simultaneously, so that the cloud game server starts a corresponding game program based on the trial request.

In 220: generating, by the target server, the target game data based on the trial request.

The target game data refers to game data for running the game program corresponding to the trial request at a target trial node, and may include but is not limited to at least one of virtual character data, virtual prop data, and virtual scene data.

Figure 13:
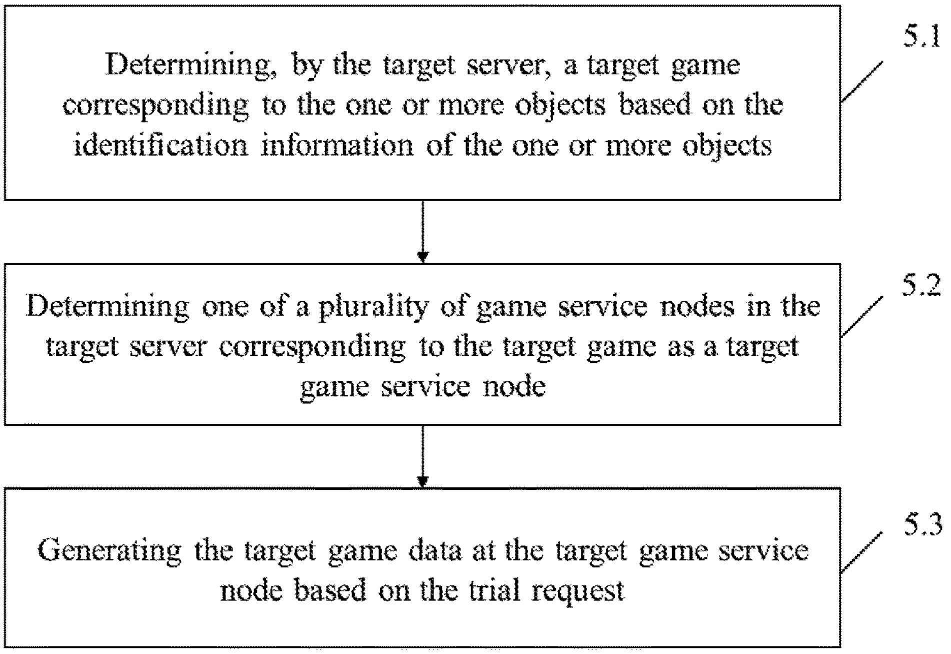
FIG. 13 is a schematic flowchart of a method for generating target game data based on a trial request by a target server according to one or more embodiments of the present disclosure.

In some embodiments, the trial request includes the identification information of the one or more objects. Referring to FIG. 13, the operation 220 may include operations 5.1~5.3, as below:

in 5.1, determining, by the target server, a target game corresponding to the one or more objects to be traded based on the identification information of the one or more objects;

in 5.2, determining one of a plurality of game service nodes in the target server corresponding to the target game as a target game service node; and in 5.3, generating the target game data at the target game service node based on the trial request.

The game service node may refer to a node for providing game data for trying a game. For example, the game service node of the present disclosure may be specific to trial, and different game service nodes may be embodied as trial game servers of different games.

For example, in order to reduce the load of the cloud game server, the target server may be the game server. If the game service node is in the game server, there may further be a plurality of nodes (i.e., original server nodes) in the game server that provide conventional game services. It should be noted that the game service node in the present disclosure only provides a trial on the one or more objects to be traded for the user, and the game data of the game service node in the present disclosure is not synchronized to the nodes that provide the conventional game services. After the user exits a cloud game, the game data of the trial in the game service node can be deleted.

For example, the target server may be the cloud game server in which the plurality of game service nodes are deployed, and the target game data may be generated in the game service nodes. In this way, upon receiving the trial request, the target game data may be obtained from the game service nodes in the cloud game server, so that a load of starting a cloud game process can be reduced.

Due to various virtual assets that can be traded in the game, various objects to be traded may be displayed on the game transaction platform, and objects to be traded of a same type may come from different game servers (for example, props A in two region servers are two objects to be traded of the same type on the game transaction platform), thereby diversifying the objects to be traded that can be displayed on the game transaction platform. Thus, a plurality of game service nodes may be provided in the target server to allow trying different objects to be traded or to provide different play scenarios for a same object. For example, different target game data may be provided for a plurality of objects to be traded in the game transaction platform by setting a plurality of game trial servers in the game server. Thus, the target game service node needs to be determined from the plurality of game service nodes after the trial request is obtained. Since each of the plurality of game service nodes corresponds to one of a plurality of different types of games, to improve an efficiency of determining the target game service node, the target game service node may be determined based on the identification information of the one or more objects. For example, the identification information of the one or more objects to be traded may be matched against identification information of virtual assets in the different types of games. If the identification information of the one or more objects to be traded matches identification information of any one of the virtual assets in the different types of games, a game corresponding to the virtual asset may be determined as the target game. The identification information of the one or more objects to be traded may further include the identification of a game which the one or more objects to be traded belong to, and a corresponding game is determined as the target game based on the identification of the game. After determining the target game, game data corresponding to the target game may be generated to facilitate calling of the cloud game server.

Figure 14:
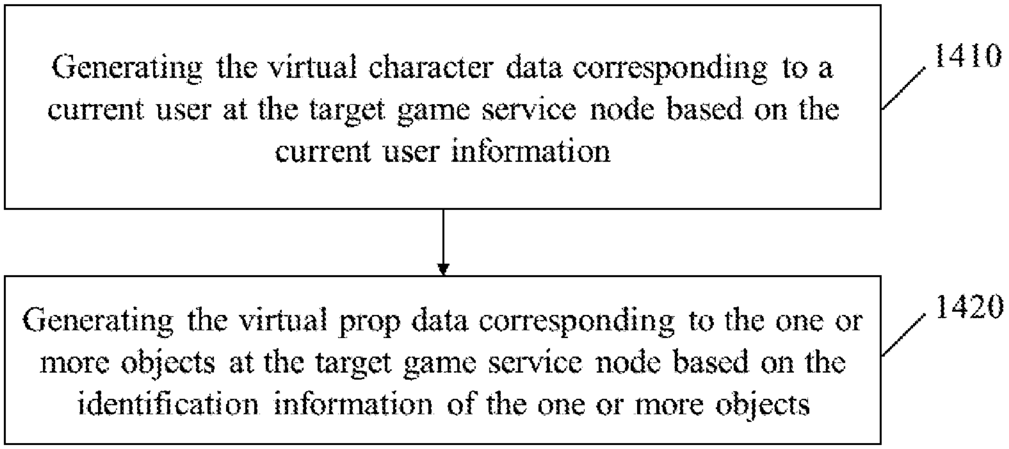
FIG. 14 is a schematic flowchart of another method for generating target game data based on a trial request by a target server according to one or more embodiments of the present disclosure.

In some embodiments, the game data includes virtual character data and virtual prop data, the trial request includes the identification information of the one or more objects to be traded and the current user information, and the one or more objects to be traded include the virtual prop. Referring to FIG. 14, generating the target game data at the target game service node based on the trial request may include:

in 1410, generating the virtual character data corresponding to the current user at the target game service node based on the current user information; and in 1420, generating the virtual prop data corresponding to the one or more objects to be traded at the target game service node based on the identification information of the one or more objects.

The virtual character data refers to data of a virtual character in a game. The virtual character data may be, for example, information relating to fight force of the virtual character, and may include, but is not limited to, one or more of a grade, a blood volume value, a magic value, a gold coin value, equipment information, fight force information, skill information, and the like, of the virtual character. The virtual prop data refers to data of a virtual prop in a game, for example, information relating to fight force of the virtual prop, and may include, but is not limited to, one or more of a grade, an attribute, a durability, and the like of the virtual prop.

When the one or more objects to be traded is the virtual prop, a virtual character of the current user's account in the game can be loaded in the game program, so that the user can use the virtual character to operate the virtual prop in the game program run by the cloud game server, thereby providing the user with an immersive virtual prop trial before a transaction, and improving trial experience of the user. It should be noted that when the user does not have a corresponding game account or virtual character in the game, the target server may create a virtual character for the user at the target game service node to operate the one or more objects.

Figure 15:
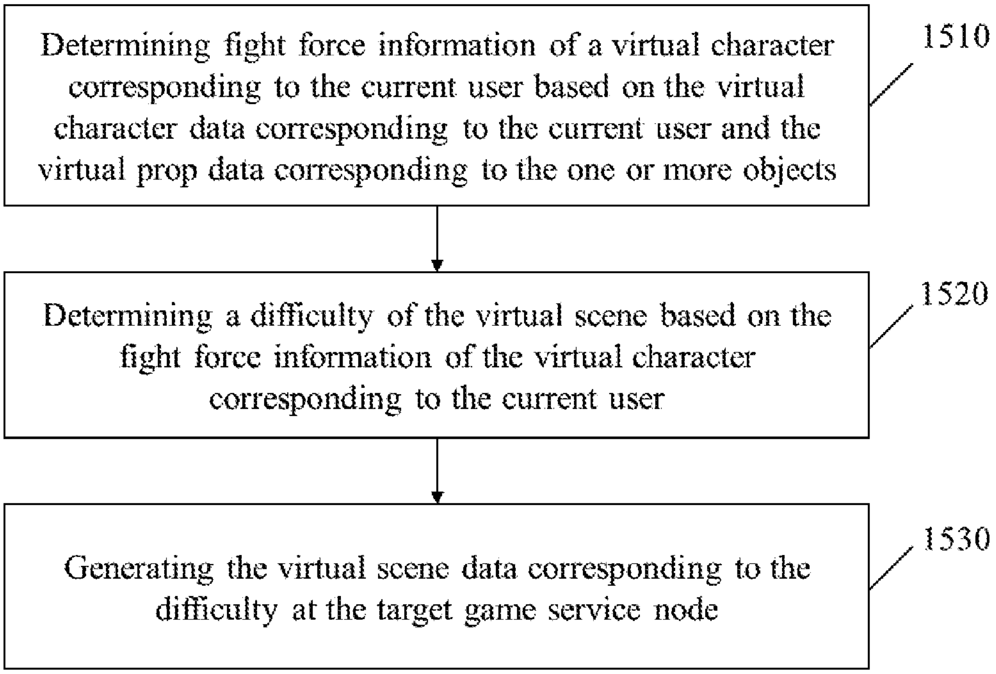
FIG. 15 is a schematic flowchart of still another method for generating target game data based on a trial request by a target server according to one or more embodiments of the present disclosure.

In some embodiments, the game data may further include virtual scene data Referring to FIG. 15, generating the target game data at the target game service node based on the trial request may further include:

- in 1510, determining fight force information of a virtual character corresponding to the current user based on the virtual character data corresponding to the current user and the virtual prop data corresponding to the one or more objects;
- in 1520, determining a difficulty of the virtual scene based on the fight force information of the virtual character corresponding to the current user; and
- in 1530, generating the virtual scene data corresponding to the difficulty at the target game service node.

The virtual scene data refers to data used to construct a virtual scene of a cloud game, and may correspond as a whole or in part to data of a virtual scene of a cloud game run by the target trial node.

The fight force information refers to information indicating a fight force level of a virtual character in a game. For example, the fight force information may be represented by a fight force value. For example, a life value of the virtual character may be determined according to a blood value or a magic value of the virtual character corresponding to the current user, and an attack capability of the virtual character may be determined according to equipment information, fight force information, or skill information. For each of the one or more objects, an attack capability of the object to be traded is determined based on a grade, an attribute, or a durability of the object. A weight calculation is performed on the life value and the attack capability of the virtual character and the attack capability (capabilities) of the one or more objects to be traded to obtain the fight force value.

The difficulty of the virtual scene refers to a game difficulty corresponding to the virtual scene. In practical applications, the game may have a plurality of virtual scenes, each of which may have a corresponding game difficulty. For example, the game may be provided with a plurality of virtual scenes for trial, each of which corresponds to a different game difficulty. After the fight force information of the virtual character is determined, a virtual scene with a game difficulty matched with the fight force information can be generated at the target trial node, to improve accuracy of virtual scene setting and the trial experience of the user.

After the fight force information of the one or more objects to be traded is determined, a virtual scene with a game difficulty matched with the fight force information can be generated, to improve the accuracy of virtual scene setting and the trial experience of the user.

Figure 16:
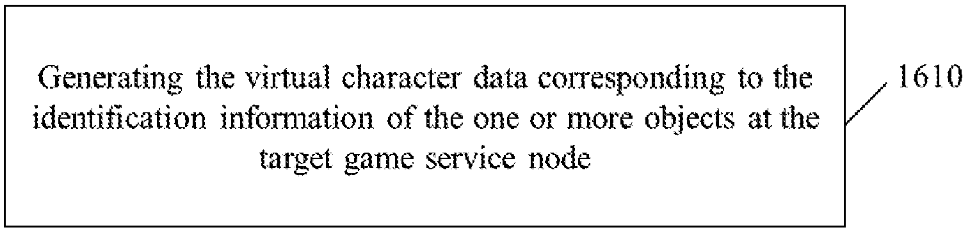
FIG. 16 is a schematic flowchart of still another method for generating target game data based on a trial request by a target server according to one or more embodiments of the present disclosure.

In some embodiments, the game data may include virtual character data, the trial request includes the identification information of the one or more object, the one or more objects to be traded includes a virtual character. Referring to FIG. 16, generating the target game data at the target game service node based on the trial request may include:

- in 1610, generating the virtual character data corresponding to the identification information of the one or more objects to be traded at the target game service node.

When the one or more objects to be traded is the virtual character, an identification of the virtual character data can be quickly obtained through the identification information, to improve a processing efficiency and the trial experience of the user.

Figure 17:
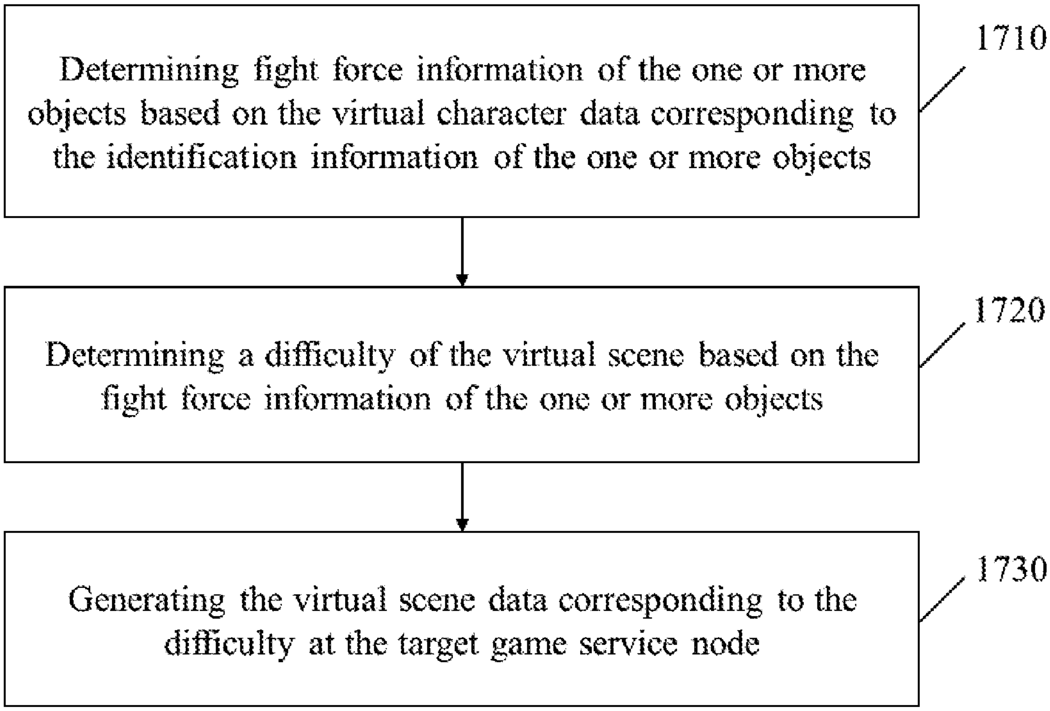
FIG. 17 is a schematic flowchart of still another method for generating target game data based on a trial request by a target server according to one or more embodiments of the present disclosure.

In some embodiments, the game data may further include the virtual scene data. Referring to FIG. 17, generating the target game data at the target game service node based on the trial request may further include:

- in 1710, determining fight force information of the one or more objects to be traded based on the virtual character data corresponding to the identification information of the one or more objects;
- in 1720, determining a difficulty of the virtual scene based on the fight force information of the one or more objects; and
- in 1730, generating the virtual scene data corresponding to the difficulty at the target game service node.

After the fight force information of the one or more objects to be traded is determined, a virtual scene with a game difficulty matched with the fight force information can be generated, to improve the accuracy of virtual scene setting and the trial experience of the user.

In 230: starting, by the cloud game server, the game program corresponding to the trial request.

Figure 18:
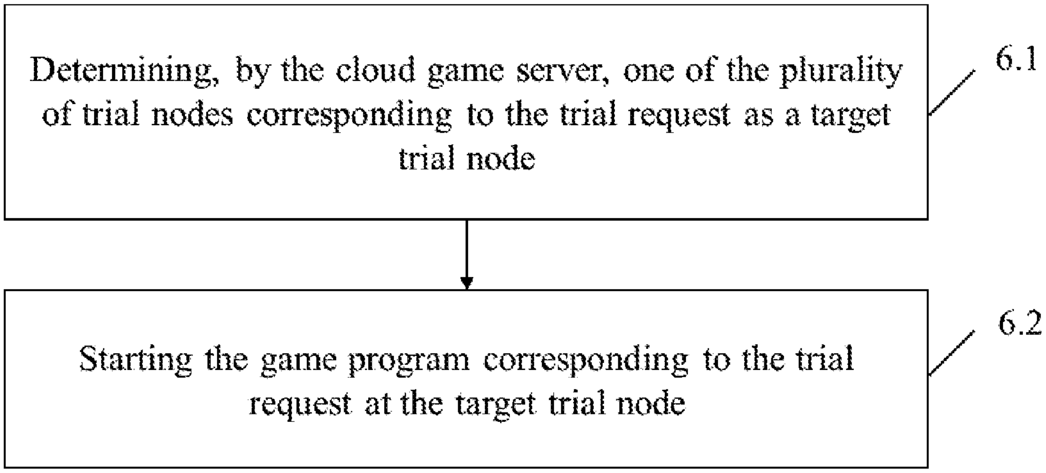
FIG. 18 is a schematic flowchart of a method for starting a game program corresponding to a trial request by a cloud game server according to one or more embodiments of the present disclosure.

In some embodiments, the cloud game server may include a plurality of trial nodes, and the operation 230 may include operation 6.1~6.2 as shown in FIG. 18, as below:

- in 6.1, determining, by the cloud game server, a trial node corresponding to the trial request among the plurality of trial nodes as the target trial node; and
- in 6.2, starting the game program corresponding to the trial request at the target trial node.

The trial node refers to a node for running a game program in the cloud game server. In some embodiments of the present disclosure, the plurality of trial nodes may be deployed in the cloud game server, and the trial nodes may provide service nodes for the user to perform conventional login and for cloud game support.

The target game trial node may obtain the target game data from the target game service node and start a cloud game process of the one or more objects to be traded in the transaction interface at the target game trial node.

For example, in some embodiments, the plurality of trial nodes may correspond to a plurality of different games. For example, virtual assets of five games (games 1~5) are displayed on a game transaction platform, and the cloud game server may include trial nodes 1 to 5, each of which provides a trial service for one of the five games. For example, when the user clicks an object to be traded in the game 3 on the game transaction platform, the trial node corresponding to the game 3 may start a game progress of the game 3 and generate the object to be traded in the virtual scene.

For example, in some embodiments, at least two trial nodes of the plurality of trial nodes may provide different virtual scenes for one game. For example, the cloud game server may obtain the target game data from the target game service node based on the trial request after receiving the trial request, and determine a corresponding difficulty of the virtual scene based on the target game data. When the one or more objects to be traded are a virtual character, the target game data may include game data of the virtual character, fight force information of the virtual character may be determined based on the game data of the virtual character, the corresponding difficulty of the virtual scene is determined based on the fight force information, and a trial node matched with the difficulty of the virtual scene is determined as the target trial node. When the one or more objects to be traded are a virtual prop, the target game data may include game data of a virtual character corresponding to the user and data of the virtual prop corresponding to the one or more objects, fight force information of the virtual character may be determined based on the target game data, the corresponding difficulty of the virtual scene is determined based on the fight force information, and a trial node matched with the difficulty of the virtual scene is determined as the target trial node.

In 240: generating, by the cloud game server, a game interface corresponding to the trial request based on the target game data through the game program corresponding to the trial request.

The game interface includes a virtual scene and one or more virtual objects in the virtual scene respectively corresponding to the one or more objects. The game interface includes a picture corresponding to a video stream sent by the cloud game server. The video stream includes stream data obtained by encoding a game picture by the cloud game server, the game picture being generated by running a game program that is installed in the cloud game server and corresponds to the trial request.

The cloud game server may generate game interface data corresponding to the one or more objects to be traded based on the target game data, and send the game interface data to the terminal, and may establish a control connection link through which the user can operate a cloud game on the terminal, and the cloud game server can receive game operation information of the user at the terminal and adjust the game interface data in real time.

In 250: transmitting, by the cloud game server, the game interface corresponding to the trial request to the terminal.

After receiving the game interface data from the cloud game, the terminal may render the game interface data on a graphical user interface of the terminal in real time to display the game interface.

The cloud game server may start the corresponding game program based on the trial request, obtain the desired target game data from the target server through the game program, generate a game interface corresponding to the one or more objects, and send the game interface to the terminal. In this way, the game program corresponding to the trial request can be started by the trial request, and a diversified manner for displaying the one or more objects to be traded before a transaction can be provided.

As can be seen from the above, the embodiments of the present disclosure may provide the user with various ways for displaying and trying the one or more objects before a transaction.

The method according to the above embodiments will be described in detail below.

In one or more embodiments, the method according to the embodiments of the present disclosure will be described in detail by taking an interaction process between the terminal and the cloud game server as an example.

Figure 3:
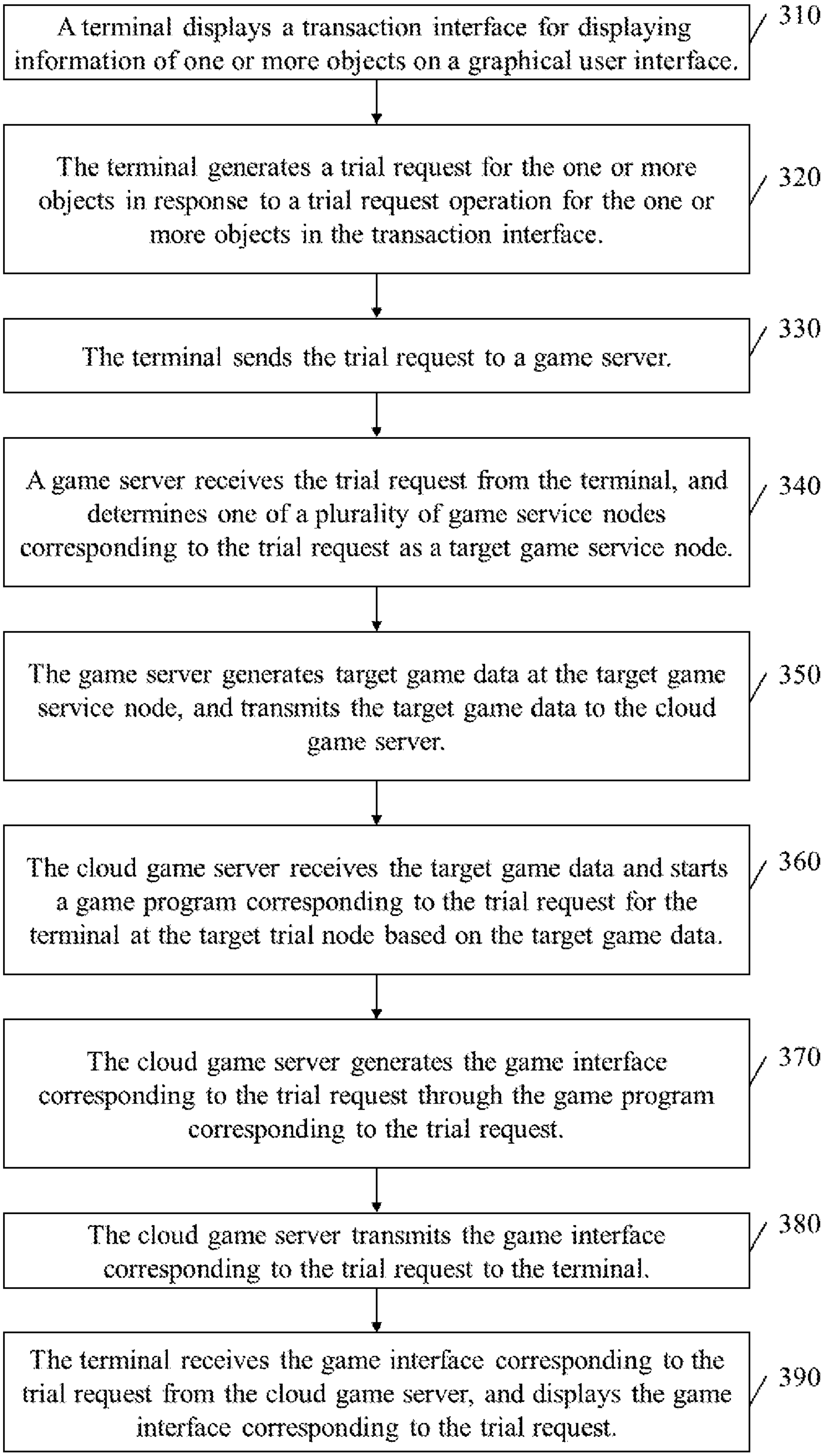
FIG. 3 is a schematic flowchart of a cloud game starting method according to one or more embodiments of the present disclosure.

As shown in FIG. 3, a specific flow of the cloud game starting method is as below.

In 310, a terminal displays a transaction interface for displaying information of one or more objects to be traded on a graphical user interface.

For example, a user may log in a game transaction platform through the terminal, enters a homepage of the game transaction platform, and enters a detail page (i.e., the transaction interface) of the prop A by clicking any one (e.g., the prop A) of props on the home page. The detail page of prop A is shown in FIG. 1C.

In 320, the terminal generates a trial request for the one or more objects to be traded in response to a trial request operation for the one or more objects to be traded in the transaction interface.

When the user clicks a trial request control in the detail page, the terminal generates the trial request and send the trial request to the cloud game server. The trial request may include account information of the user and an item number MHXY13311 a carrying prop (denoted as P), wherein MHXY represents an abbreviation of the game which the prop P belongs to and 13311 is a code of the prop P in the game.

In 330, the terminal sends the trial request to a game server.

In 340, a game server receives the trial request from the terminal, and determines one of a plurality of game service nodes corresponding to the trial request as a target game service node.

The game server includes a plurality of game service nodes, and different game service nodes correspond to different games. After receiving the trial request, the game server determines a game A corresponding to the prop P based on the MHXY in the item number MHXY13311, and determines a game service node corresponding to the game corresponding to the prop P as the target game service node.

In 350, the game server generates target game data at the target game service node, and transmits the target game data to the cloud game server.

In some embodiments, since the target game service node is a node corresponding to the game corresponding to the prop P, all or a portion of data of the game corresponding to the prop P may be stored in the target game service node when the target game service node is deployed. Therefore, in the operation 350, the target game service node may obtain data of a virtual character (denoted as C) based on the account information of the user, obtain data of the virtual prop P based the item number of the virtual prop P, and virtual scene data from the stored data, and send the obtained data as target data to a target trial node of the cloud game server.

In some embodiments, the target game service node may obtain virtual scene data with a difficulty corresponding to the virtual character C from the stored data based on fight force information of the virtual character C, and send the virtual scene data to the cloud game server.

In 360, the cloud game server receives the target game data and starts a game program corresponding to the trial request for the terminal at the target trial node based on the target game data.

The target trial node may start the game program used to process game interface data for generating the trial request, and create a control connection link connected to the terminal. Understandably, corresponding to the trial request is corresponding to the one or more object.

In 370, the cloud game server generates the game interface corresponding to the trial request through the game program corresponding to the trial request.

The cloud game server may generate a game interface including the virtual character C and the virtual prop P based on the target game data through the game program run by the target trial node.

In 380, the cloud game server transmits the game interface corresponding to the trial request to the terminal.

The cloud game server transmits a game field including the virtual character CA and the virtual prop P to the terminal in the form of a video stream or the like.

In 390, the terminal receives the game interface corresponding to the trial request from the cloud game server, and displays the game interface corresponding to the trial request.

After receiving game interface data including the virtual character C and the virtual prop PA, the terminal displays the game interface including the virtual character C and the virtual prop P on the graphical user interface of the terminal based on the game interface data. Meanwhile, the target trial node may receive game operation information of the user on the terminal through the control connection link, and adjust the game interface data in real time.

A specific method for implementing the above operations can be found in the above embodiments.

As can be seen from the above, by using a solution provided in the present embodiment of the present disclosure, the game program corresponding to the one or more objects to be traded can be started to provide a diversified manner for displaying the one or more objects to be traded before a transaction.

The methods according to the above embodiments will be further described in detail hereinafter.

Figure 4A:
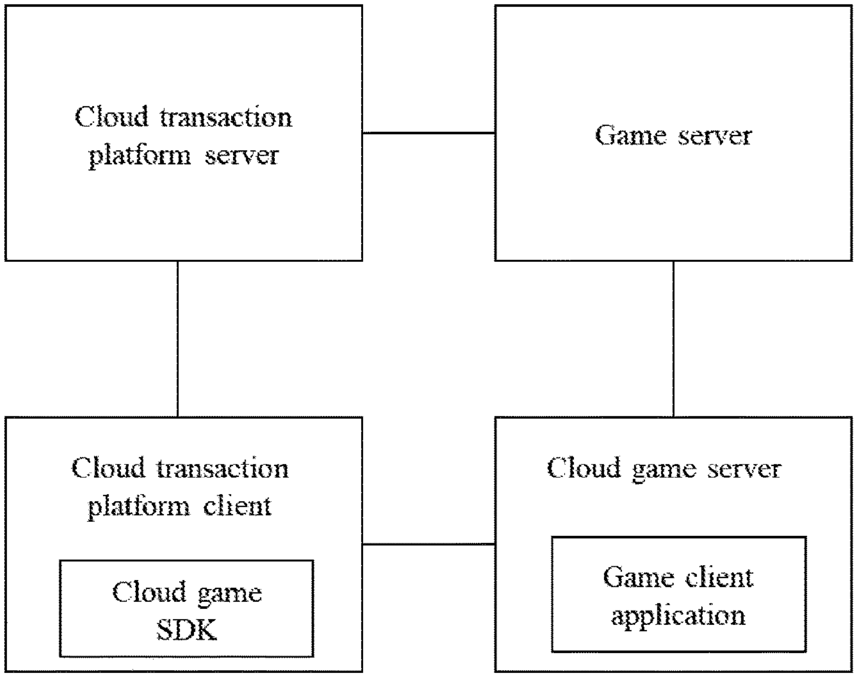
FIG. 4A schematically illustrates interaction between a game transaction platform client, a game transaction platform server, a game server, and a cloud game server in a cloud game starting method according to one or more embodiments of the present disclosure.

In one or more embodiments, as shown in FIG. 4A, a game transaction platform client is installed in a terminal, a cloud game software development kit (SDK) is integrated in the game transaction platform client, a trial node in a cloud game server is a client node, a target trial node is a target client node, a game client application is integrated in the client node, and the game transaction platform client can interact with the cloud game server through the game transaction platform server.

The game transaction platform client is a terminal application of a game transaction platform. The game transaction platform server provides a service for the game transaction platform client to complete various transaction behaviours of a user. The cloud game SDK is a terminal application for displaying and operating a cloud game service, through which the user can operate a remote game running environment on the current terminal. As used herein, a cloud game terminal application is integrated on the game transaction platform client in the form of an SDK, so that the game transaction platform client has a capability of a cloud game. The client node includes a virtual machine running on a cloud, a cloud game scheduling server, or the like. The client node provides a remote cloud game running environment and provides a service for a server node. The game client application is integrated in the client node. A game server provides a service to a cloud game client application. The game server may be a server of a specific game. For example, a game service node of the game server may provide a dedicated trial server of a game for the user.

An interaction between the game transaction platform client and the game transaction platform server mainly includes: acquisition of a service application programming interface (API) of the game transaction platform client, initiation of a trial request logic, trial data preparation, and the like. An interaction between the game transaction platform server and the server node mainly includes that: the game transaction platform server sends a transaction request, a trial request, or the like to the game server, and the game server returns transaction and trial processing results to the game transaction platform server. An interaction between the cloud game SDK in the game transaction platform client and the game client application in the client node mainly includes that: the cloud game SDK obtains image information of the game client application and displays the image information, and the game client application obtains player operation information captured from the cloud game SDK and makes a corresponding response.

In one or more embodiments, an interaction process between the game transaction platform client, the game transaction platform server, the game server, and the client node is taken as examples to describe the methods of the present embodiment in detail.

Figure 4B:
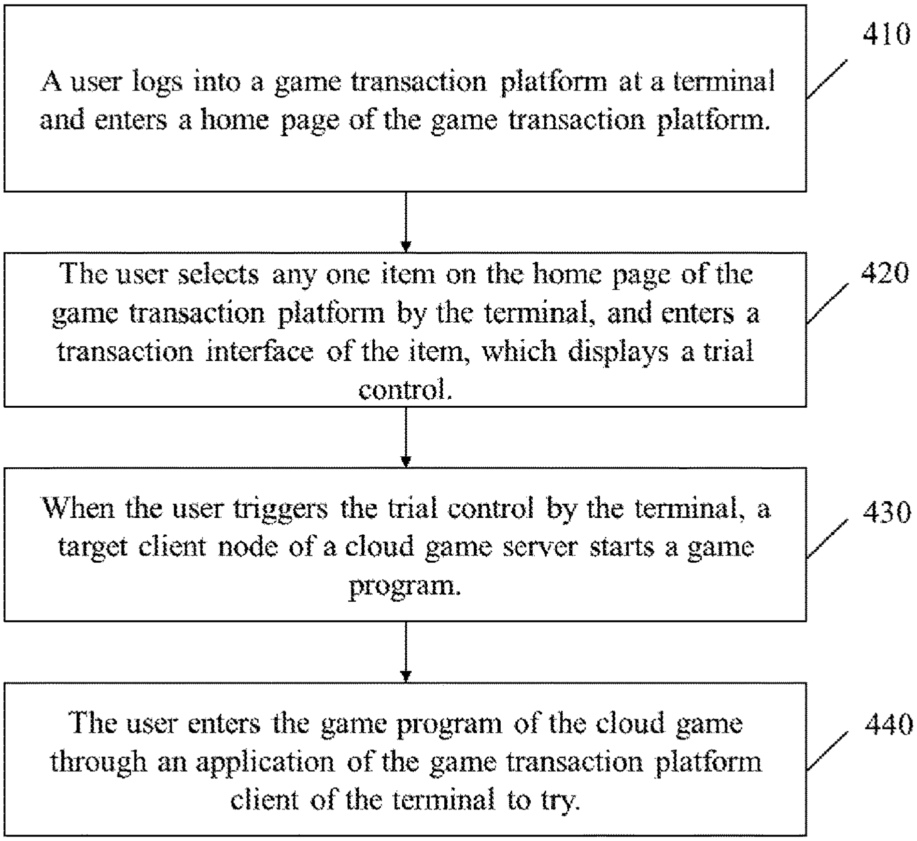
FIG. 4B is a schematic flowchart of a cloud game starting method according to one or more embodiments of the present disclosure.
Figure 4C:
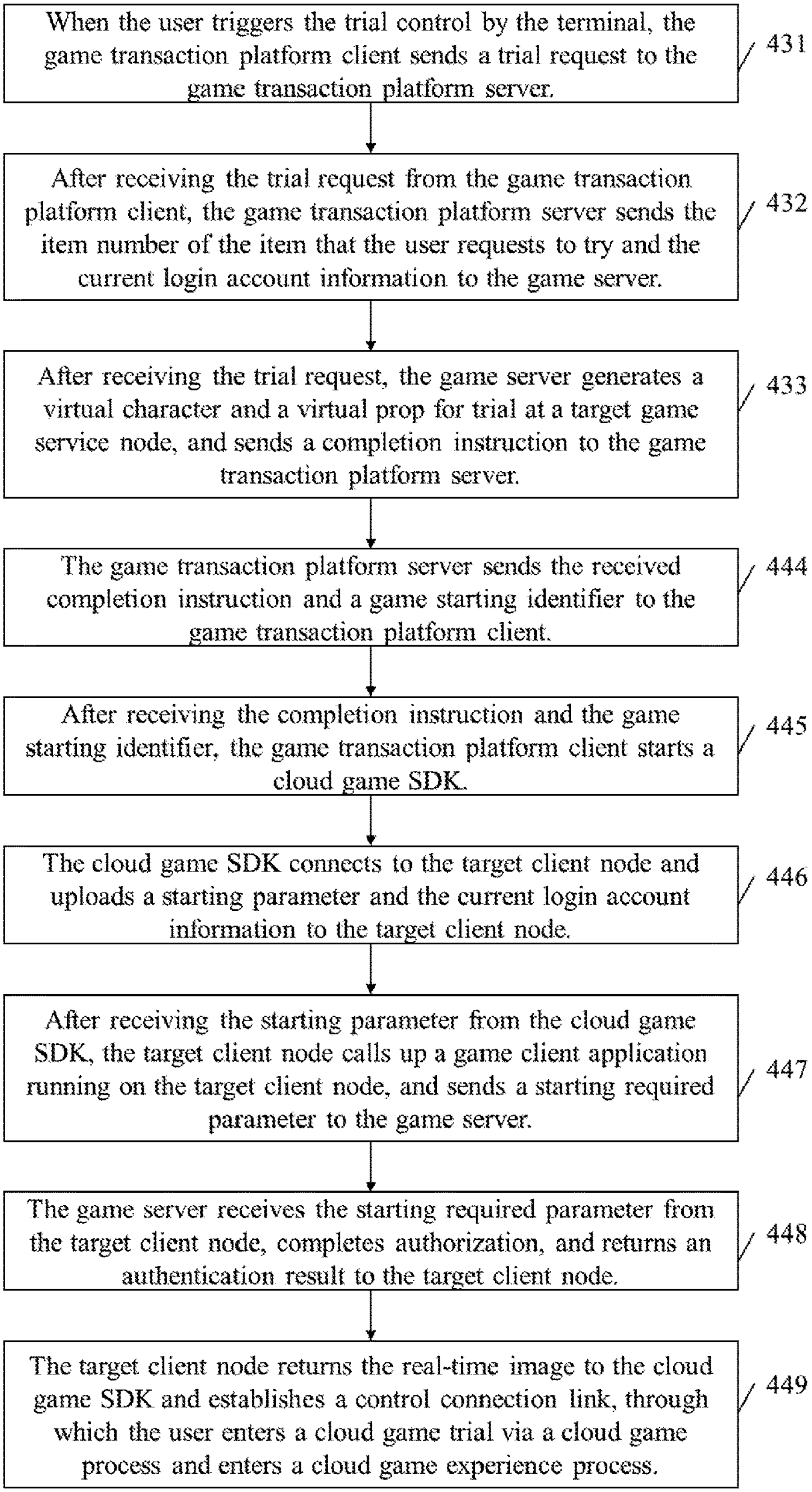
FIG. 4C is a schematic flowchart of operations of starting a game program through interaction between a terminal, a game server, and a cloud game server in a cloud game starting method according to one or more embodiments of the present disclosure.

As shown in FIG. 4B, a specific flow of a cloud game starting method is as below.

In 410, a user logs into a game transaction platform at a terminal and enters a home page of the game transaction platform.

The game transaction platform is a where the user performs a virtual game item transaction, on which the user can view and purchase virtual game items that have been listed for sale by other users. The items on the game transaction platform all come from real asset data in the game. After the users put an item on the game transaction platform, the game transaction platform returns a unique item number, which is used for communication of a status of the item between the game transaction platform server and the service node.

The game transaction platform may include two types of items that can be tried: game characters and non-game characters, where the non-game characters generally include equipment, summoning animals, weapons, armaments, shoes, and the like.

In 420, the user selects any one item on the home page of the game transaction platform by the terminal, and enters a transaction interface of the item, which displays a trial control.

The user can select one item, and click and view a detail page of the item. The detail page of the item may display a cloud trial entry. The cloud trial entry may be a cloud trial button. By clicking the cloud trial button, a cloud game module can be started.

In 430, when the user triggers the trial control by the terminal, a target client node of a cloud game server starts a game program.

A client node of the cloud game server starts the cloud game module (a cloud game process) to run the game program, remotely loads cloud game trial data (target game data), to complete data preparation and loading. The target client node is a target trial node.

Figure 4D:
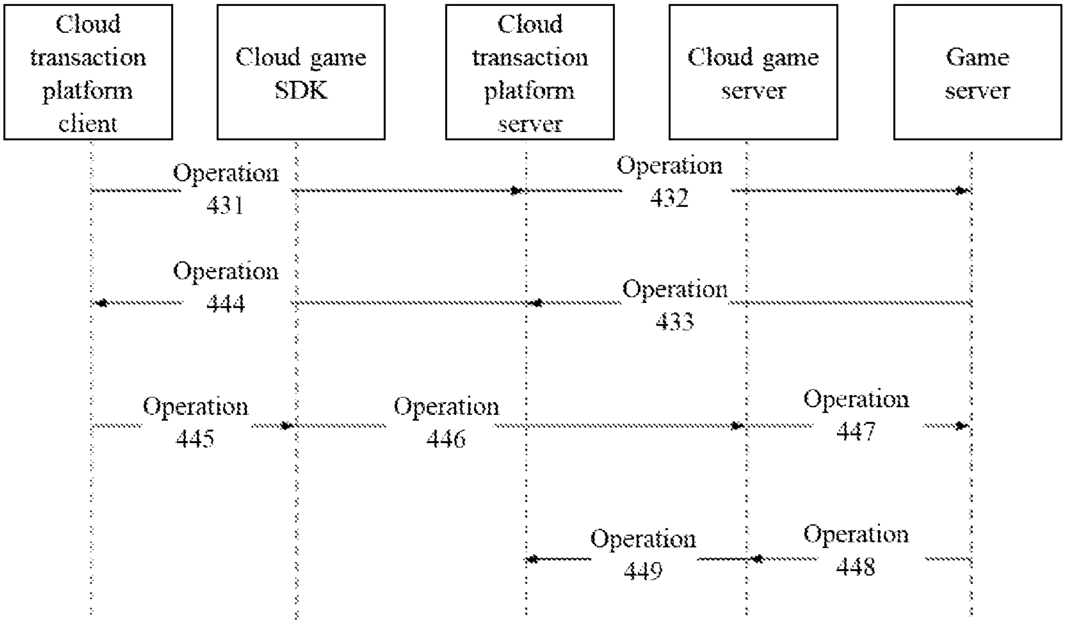
FIG. 4D is a sequence diagram of operations of starting a game program through interaction between a terminal, a game server, and a cloud game server in a cloud game starting method according to one or more embodiments of the present disclosure.

As shown in FIGS. 4B and 4D, a specific flow of the operation 430 is as below.

In 431, when the user triggers the trial control by the terminal, the game transaction platform client sends a trial request to the game transaction platform server.

The trial request includes an item number of an item that the user requests to try, information of an original server on which the item is located, and current login account information.

In 432, after receiving the trial request from the game transaction platform client, the game transaction platform server sends the item number of the item that the user requests to try and the current login account information to the game server.

It should be noted that it may be set that the user can enter a cloud game for trial from the game transaction platform only when a game transaction platform account is consistent with a game account. For example, the game transaction platform account and the game account may be a same mailbox account. In such case, only when the user logs in the game transaction platform, can the user try the cloud game.

In 433, after receiving the trial request, the game server generates a virtual character and a virtual prop for trial at a target game service node, and sends a completion instruction to the game transaction platform server.

The game server may store account information of a trial user, character information and prop information that need to be tried, and configuration information of a server node (e.g., switch configuration information of play ways, scene data). For example, in a virtual scene provided by the game server, a part of the virtual scene may be limited. A specific limitation method is to issue a switch configuration, to intercept the user at a specific scene entrance or set a specific combat scene for the trial user. The specific limitation method may be determined according to specific setting of the game. The completion instruction is an instruction corresponding to completion information of generating the virtual character and the virtual prop to be tried, that is, an instruction indicating that the game server finishes loading the target game data.

After the game transaction platform server sends data of the trial request and the current login account information to the game server, the game server generates corresponding character and prop information for the current login account information at the target game node immediately. In a subsequent flow, the user can log in an account that the user has requested for trial, thereby completing authentication of a trial flow. For example, the game server may copy data of an item with the item number in game data from an original server node to the target game service node. In some embodiments, when the user initiates a new character trial, old character data in the target game service node may be deleted. The original server node may be a node in the game server that stores all data of the game.

In 434, the game transaction platform server sends the received completion instruction and a game starting identifier to the game transaction platform client.

In 435, after receiving the completion instruction and the game starting identifier, the game transaction platform client starts a cloud game SDK.

In 436, the cloud game SDK connects to the target client node and uploads a starting parameter and the current login account information to the target client node.

In 437, after receiving the starting parameter from the cloud game SDK, the target client node calls up a game client application running on the target client node, and sends a starting required parameter to the game server.

The starting required parameter include the current login account information. After the target client node starts the game client application, the game client application can generate data of a game picture based on the target game data obtained from the game server, that is, generate a real-time image operated by the game, and send the real-time image to the terminal through a control connection link.

In 438, the game server receives the starting required parameter from the target client node, completes authorization, and returns an authentication result to the target client node.

The authorization refers to authorized login of a login account. Since both a treasure house and the game are logged in through a same account, under the circumstances that the game transaction platform has been logged in, the started cloud game may realize automatic login through an authorized login service of the game transaction platform. That is, the user may automatically log in the cloud game using the game transaction platform account. The authentication result refers to that the game client application pre-installed at the client node obtains a login state, that is, cookie login information of the user.

After the game server returns the authentication result, the game server may send game data for rendering the real-time image operated by the game to the target client node of the cloud game server.

In 439, the target client node returns the real-time image to the cloud game SDK and establishes a control connection link, through which the user enters a cloud game trial via a cloud game process and enters a cloud game experience process.

In 440, the user enters the game program of the cloud game through an application of the game transaction platform client of the terminal to try.

In a trial cloud game, a trial time and a restricted entrance of a trial server may be set. When the user enters the trial server, a virtual character operated by the user may appear at a location of a game NPC in the game by default, from which the user may start trying the virtual character. A virtual prop to be tried by the user may be placed on the game NPC, so that the user may pick up the virtual prop from the game NPC in the game.

As can be seen from the above, the embodiments of the present disclosure can start a game program corresponding to one or more objects to be traded based on a trial request operation of a user in the transaction interface, and provide a diversified manner for displaying the one or more objects to be traded before a transaction.

In order to better implement the above methods, one or more embodiments of the present disclosure further provide a cloud game starting apparatus. The cloud game starting apparatus may be specifically integrated in an electronic device, which may be a terminal, a server, or the like. The terminal may be a mobile phone, a tablet computer, a Bluetooth device, a notebook computer, a personal computer, or the like. The server may be a single server or a cluster of servers.

For example, in one or more embodiments, the methods of the embodiments of the present disclosure will be described in detail by taking a cloud game starting apparatus integrated into a computer device as an example.

Figure 5:
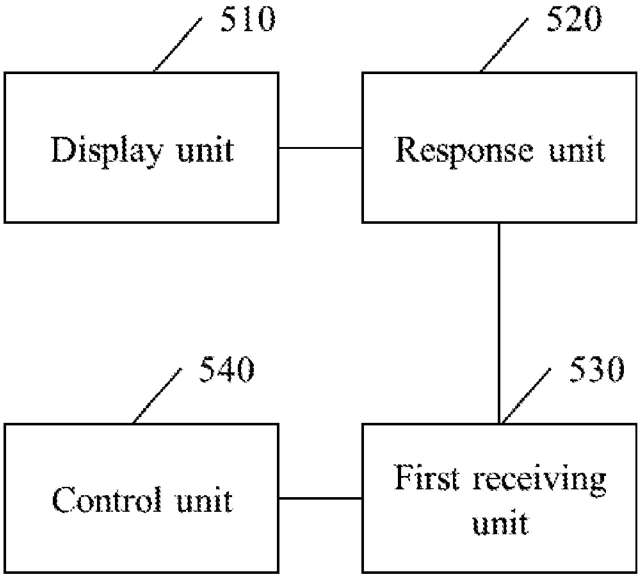
FIG. 5 is a schematic block diagram of a cloud game starting apparatus according to one or more embodiments of the present disclosure.

For example, as shown in FIG. 5, the cloud game starting apparatus may include a display unit 510, a response unit 520, a first receiving unit 530, and a control unit 540, as below.

(I) Display Unit 510

The display unit 510 may be configured to display, by a terminal, a transaction interface for displaying information of one or more objects to be traded.

(II) Response Unit 520

The response unit 520 may be configured to generate a trial request for the one or more objects to be traded in response to a trial request operation for the one or more objects to be traded in the transaction interface.

In some embodiments, the trial request corresponds to at least two objects to be traded of the one or more objects, and the response unit 520 may be further configured to:

generate a switching request in response to a trigger operation for the switching control;

receive, by the terminal, a second game interface corresponding to the switching request from the cloud game server; and display the second game interface by the terminal.

In some embodiments, the terminal also displays a storage control, and the response unit 520 may further be configured to:

store, by the terminal, identification information of at least one object to be traded of the one or more objects to be traded in a local memory in response to a trigger operation for the storage control; and after the game program corresponding to the trial request is ended, mark in the transaction interface one of the one or more objects to be traded having the identification information stored in the local memory as a target object to be traded, to enable a transaction operation on the target object to be traded in the transaction interface.

(III) First Receiving Unit 530

The first receiving unit 530 may be configured to receive a game interface corresponding to the trial request from a cloud game server. The game interface includes a virtual scene and one or more virtual objects in the virtual scene respectively corresponding to the one or more objects. The game interface includes a picture corresponding to a video stream sent by the cloud game server. The video stream includes stream data obtained by encoding a game picture by the cloud game server, the game picture being generated by running a game program that is installed in the cloud game server and corresponds to the trial request.

In some embodiments, the first receiving unit 530 may further be configured to:

display the game interface corresponding to the trial request by the terminal.

In some embodiments, the trial request may correspond to at least two different types of objects to be traded of the one or more objects. The displaying of the game interface corresponding to the trial request by the terminal may include:

receiving, by the terminal, game interfaces respectively corresponding to the at least two different types of objects to be traded from the cloud game server; and displaying, by the terminal, the game interface comprising the game interfaces respectively corresponding to the at least two different types of objects to be traded.

(IV) Control Unit 540

The control unit 540 may be configured to receive, by the terminal, a control instruction to control the one or more virtual objects to perform one or more game operations.

In a specific implementation, each of the above units may be implemented as an independent entity, or may be implemented in any combination as a same entity or several entities. For a specific implementation of each of the above units, reference may be made to the foregoing method embodiments, and details are not described herein.

Thus, the embodiments of the present disclosure may start the game program corresponding to the one or more objects to be traded based on the trial request operation of the user in the transaction interface, and provide a diversified manner for displaying the one or more objects to be traded before a transaction.

In order to better implement the above method(s), one or more embodiments of the present disclosure further provide a cloud game starting apparatus. The cloud game starting apparatus may be specifically integrated in an electronic device, which may be a terminal, a server, or the like. The terminal may be a mobile phone, a tablet computer, a Bluetooth device, a notebook computer, a personal computer, or the like. The server may be a single server or a cluster of servers.

For example, in one or more embodiment, the methods of the embodiments of the present disclosure will be described in detail by taking a cloud game starting apparatus integrated into a computer device as an example.

Figure 6:
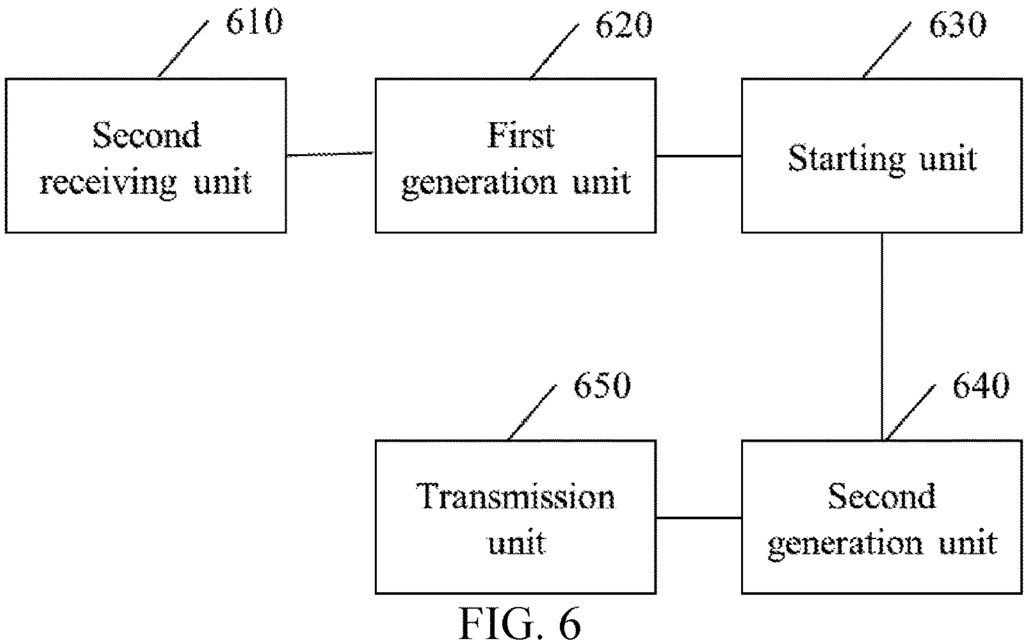
FIG. 6 is a schematic block diagram of a cloud game starting apparatus according to one or more embodiments of the present disclosure.

For example, as shown in FIG. 6, the cloud game starting apparatus may include a second receiving unit 610, a first generation unit 620, a starting unit 630, a second generation unit 640, and a transmission unit 650, as below.

(I) Second Receiving Unit 610

The second receiving unit 610 may be configured to receive, by a target server, a trial request generated by a terminal.

In some embodiments, the trial request includes current user information and identification information of the one or more objects. The second receiving unit 610 may be configured to verify the current user information by the target server, so that the target server generates the target game data based on the trial request in response to the current user information passing verification.

In some embodiments, the second receiving unit 610 may further be configured to:

receive, by a transaction server, the trial request sent by the terminal;

receiving, by the target server, the trial request from transaction server; and transmit, by the target server, the target game data to the cloud game server.

(II) First Generation Unit 620

The first generation unit 620 may be configured to generate, by the target server, target game data based on the trial request.

In some embodiments, the trial request includes identification information of the one or more objects, and the first generation unit 620 may be specifically configured to:

determine, by the target server, a target game corresponding to the one or more objects to be traded based on the identification information of the one or more objects;

determine one of a plurality of game service nodes in the target server corresponding to the target game as a target game service node; and generate the target game data at the target game service node based on the trial request.

In some embodiments, the target game data may include virtual character data and virtual prop data, the trial request may include the identification information of the one or more objects to be traded and current user information, the one or more objects to be traded may include a virtual prop. Generating the target game data at the target game service node based on the trial request may include:

generating virtual character data corresponding to a current user at the target game service node based on the current user information; and generating virtual prop data corresponding to the one or more objects to be traded at the target game service node based on the identification information of the one or more objects.

In some embodiments, the target game data may further include virtual scene data. Generating the target game data at the target game service node based on the trial request may further include:

determining fight force information of a virtual character corresponding to the current user based on the virtual character data corresponding to the current user and the virtual prop data corresponding to the one or more objects;

determining a difficulty of the virtual scene based on the fight force information of the virtual character corresponding to the current user; and generating the virtual scene data corresponding to the difficulty at the target game service node.

In some embodiments, the target game data may include virtual character data, the trial request may include identification information of the one or more objects, the one or more objects to be traded may include a virtual character. Generating the target game data at the target game service node based on the trial request includes:

generating the virtual character data corresponding to the identification information of the one or more objects to be traded at the target game service node.

In some embodiments, the target game data may further include virtual scene data. Generating the target game data at the target game service node based on the trial request may further include:

determining fight force information of the one or more objects to be traded based on the virtual character data corresponding to the identification information of the one or more objects;

determining a difficulty of the virtual scene based on the fight force information of the one or more objects; and generating the virtual scene data corresponding to the difficulty at the target game service node.

(III) Starting Unit 630

The starting unit 630 may be configured to start, by the cloud game server, a game program corresponding to the trial request.

In some embodiments, the cloud game server may include a plurality of trial nodes, and the starting unit 630 may be specifically configured to:

determine, by the cloud game server, a trial node corresponding to the trial request among the plurality of trial nodes as a target trial node; and start the game program corresponding to the trial request at the target trial node.

(IV) Second Generation Unit 640

The second generation unit 640 may be configured to generate, through the game program corresponding to the trial request, a game interface corresponding to the trial request based on the target game data.

(V) Transmission Unit 650

The transmission unit 650 may be configured to transmit, by the cloud game server, the game interface corresponding to the trial request to the terminal.

In the specific implementation, each of the above units may be implemented as an independent entity, or may be implemented in any combination as a same entity or several entities. For a specific implementation of each of the above units, reference may be made to the foregoing method embodiments, and details are not described herein.

Thus, the embodiments of the present disclosure may start the game program corresponding to the one or more objects to be traded based on the trial request operation of the user in the transaction interface, and provide a diversified manner for displaying the one or more objects to be traded before a transaction.

In order to better implement the above methods, one or more embodiments of the present disclosure further provide a cloud game starting system. The cloud game starting system may be specifically integrated in an electronic device, which may be a terminal, a server, or the like. The terminal may be a mobile phone, a tablet computer, a Bluetooth device, a notebook computer, a personal computer, or the like. The server may be a single server or a cluster of servers.

For example, in one or more embodiments, the methods of the embodiments of the present disclosure will be described in detail by taking a cloud game starting system integrated into a computer device as an example.

For example, the cloud game starting system may include a terminal, a target server, and a cloud game server.

The terminal may be configured to:

display a transaction interface for displaying information of one or more objects;

generate a trial request for the one or more objects to be traded in response to a trial request operation for the one or more objects to be traded in the transaction interface;

receive a game interface corresponding to the trial request from the cloud game server, wherein the game interface includes a virtual scene and one or more virtual objects in the virtual scene respectively corresponding to the one or more objects, the game interface includes a picture corresponding to a video stream sent by the cloud game server, and the video stream includes stream data obtained by encoding a game picture by the cloud game server, the game picture being generated by running a game program that is installed in the cloud game server and corresponds to the trial request; and receive a control instruction to control the one or more virtual objects to perform one or more game operations in the virtual scene.

The target server is configured to:

receive the trial request generated by the terminal, wherein the target server is a game server or a cloud game server; and generate target game data based on the trial request.

The cloud game server is configured to:

start a game program corresponding to the trial request;

generate the game interface corresponding to the trial request based on the target game data through the game program; and transmit the game interface corresponding to the trial request to the terminal.

For a specific implementation of the above operations, reference may be made to the foregoing method embodiments, and details are not described herein. An interaction flow between the terminal, the game server, and the cloud game server in the cloud game starting system may be referred to the foregoing method embodiments, and details are not described herein.

Thus, the embodiments of the present disclosure may start the game program corresponding to the one or more objects to be traded based on the trial request operation of a user in the transaction interface, and provide a diversified manner for displaying the one or more objects to be traded before a transaction.

Accordingly, an embodiment of the present disclosure further provides a computer device. The computer device may be a terminal or a server. The terminal may be a terminal device such as a smartphone, a tablet computer, a notebook computer, a touch screen, a game machine, a personal computer, or a Personal Digital Assistant (PDA).

Figure 7:
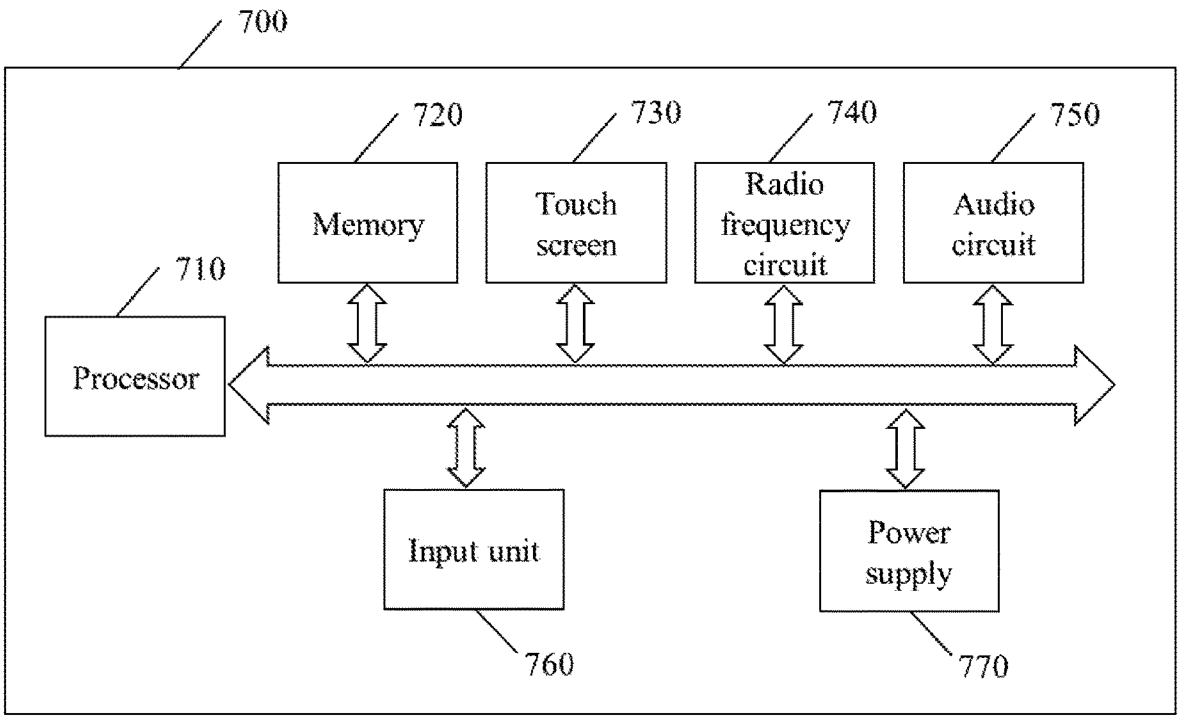
FIG. 7 is a schematic block diagram of a computer device according to one or more embodiments of the present disclosure.

As shown in FIG. 7, FIG. 7 is a schematic block diagram of a computer device 700. The computer device 700 may include a processor 710 having one or more processing cores, a memory 720 having one or more computer-readable storage media, and a computer program stored on the memory 720 and operable on the processor 710. The processor 710 is electrically connected to the memory 720. It will be appreciated by those skilled in the art that the computer device structure illustrated in the figure does not constitute a limitation on the computer device, and may include more or less components than illustrated, or may combine certain components, or may have different component arrangements.

The processor 710 is a control centre of the computer device 700, which is connected to various portions of the entire computer device 700 by various interfaces and lines, and performs various functions of the computer device 700 and processes data by running or loading software programs and/or modules stored in the memory 720 and invoking data stored in the memory 720, thereby monitoring the computer device 700 as a whole.

In some embodiments of the present disclosure, the processor 710 in the computer device 700 loads instructions corresponding to processes of one or more application programs into the memory 720 according to following operations, and runs the application programs stored in the memory 720, thereby implementing the methods of the foregoing method embodiments. The operations may include:

displaying, by a terminal, a transaction interface for displaying information of one or more objects to be traded; generating a trial request for the one or more objects to be traded in response to a trial request operation for the one or more objects to be traded in the transaction interface; receiving a game interface corresponding to the trial request from a cloud game server, wherein the game interface includes a virtual scene and one or more virtual objects in the virtual scene respectively corresponding to the one or more objects, the game interface includes a picture corresponding to a video stream sent by the cloud game server, and the video stream includes stream data obtained by encoding a game picture by the cloud game server, the game picture being generated by running a game program that is installed in the cloud game server and corresponds to the trial request; and receiving, by the terminal, a control instruction to control the one or more virtual objects to perform one or more game operations in the virtual scene.

In some embodiments, the trial request corresponds to at least two objects to be traded of the one or more objects, and after receiving the game interface corresponding to the trial request from the cloud game server, the method further includes: displaying a first game interface and a switching control by the terminal, wherein the first game interface includes a game interface corresponding to a first object to be traded of the at least two objects, and the switching control is configured to control switching of the first game interface to a second game interface including a game interface corresponding to at least one of the at least two objects to be traded other than the first object.

In some embodiments, after receiving the game interface corresponding to the trial request sent by the cloud game server, the method further includes: generating a switching request in response to a trigger operation for the switching control;

receiving, by the terminal, the second game interface corresponding to the switching request from the cloud game server; and displaying the second game interface by the terminal.

In some embodiments, after receiving the game interface corresponding to the trial request from the cloud game server, the method further includes displaying the game interface corresponding to the trial request by the terminal.

In some embodiments, the trial request is a trial request corresponding to at least two different types of objects to be traded of the one or more objects, and the displaying of the game interface corresponding to the trial request by the terminal may include: receiving, by the terminal, game interfaces respectively corresponding to the at least two different types of objects to be traded from the cloud game server; and displaying, by the terminal, the game interface comprising the game interfaces respectively corresponding to the at least two different types of objects to be traded.

In some embodiments, the terminal further displays a storage control, and after receiving the game interface corresponding to the trial request from the cloud game server, the method further includes: storing, by the terminal, identification information of at least one object to be traded of the one or more objects to be traded in a local memory in response to a trigger operation for the storage control; and after the game program corresponding to the trial request is ended, marking in the transaction interface one of the one or more objects to be traded having the identification information stored in the local memory as a target object to be traded, to enable a transaction operation on the target object to be traded in the transaction interface.

One or more embodiments of the present disclosure may implement the method of each of the foregoing method embodiments:

receiving, by a target server, a trial request generated from a terminal, wherein the target server is a game server or a cloud game server, and the trial request is generated by the terminal in response to a trial request operation for one or more objects to be traded in a transaction interface displaying information of the one or more objects, the transaction interface being displayed by the terminal; generating, by the target server, target game data in response to the trial request; starting, by the cloud game server, a game program corresponding to the trial request; generating, by the cloud game server, a game interface corresponding to the trial request based on the target game data through the game program, wherein the game interface includes a virtual scene and one or more virtual objects in the virtual scene respectively corresponding to the one or more objects, and includes a picture corresponding to a video stream sent by the cloud game server, the video stream including stream data obtained by encoding a game picture by the cloud game server, the game picture being generated by running the game program installed in the cloud game server; and transmitting, by the cloud game server, the game interface corresponding to the trial request to the terminal.

In some embodiments, the trial request includes: identification information of the one or more objects, and generating, by the target server, the target game data based on the trial request includes: determining, by the target server, a target game corresponding to the one or more objects to be traded based on the identification information of the one or more objects; determining one of a plurality of game service nodes in the target server corresponding to the target game as a target game service node; and generating the target game data at the target game service node based on the trial request.

In some embodiments, the target game data includes virtual character data and virtual prop data, the trial request includes the identification information of the one or more objects to be traded and current user information, the one or more objects to be traded includes a virtual prop, and generating the target game data at the target game service node based on the trial request includes: generating the virtual character data corresponding to a current user at the target game service node based on the current user information; and generating the virtual prop data corresponding to the one or more objects to be traded at the target game service node based on the identification information of the one or more objects.

In some embodiments, the target game data further includes virtual scene data, and generating the target game data at the target game service node based on the trial request includes: determining fight force information of a virtual character corresponding to the current user based on the virtual character data corresponding to the current user and the virtual prop data corresponding to the one or more objects; determining a difficulty of the virtual scene based on the fight force information of the virtual character corresponding to the current user; and generating the virtual scene data corresponding to the difficulty at the target game service node.

In some embodiments, the target game data includes virtual character data, the trial request includes identification information of the one or more objects, the one or more objects to be traded includes a virtual character, and generating the target game data at the target game service node based on the trial request includes: generating the virtual character data corresponding to the identification information of the one or more objects to be traded at the target game service node.

In some embodiments, the target game data further includes virtual scene data, and generating the target game data at the target game service node based on the trial request includes: determining fight force information of the one or more objects to be traded based on the virtual character data corresponding to the identification information of the one or more objects; determining a difficulty of the virtual scene based on the fight force information of the one or more objects to be traded; and generating the virtual scene data corresponding to the difficulty at the target game service node.

In some embodiments, the cloud game server includes a plurality of trial nodes, and starting, by the cloud game server, the game program corresponding to the trial request includes: determining, by the cloud game server, one of the plurality of trial nodes corresponding to the trial request as a target trial node; and starting the game program corresponding to the trial request at the target trial node.

In some embodiments, the trial request includes current user information and identification information of the one or more objects, after receiving, by the target server, the trial request generated by the terminal and before generating, by the target server, the target game data based on the trial request, the method further includes: verifying the current user information by the target server, so that the target server generates the target game data based on the trial request in response to the current user information passing verification.

In some embodiments, before the receiving, by the target server, the trial request generated by the terminal, the method further includes: receiving, by a transaction server, the trial request from the terminal; and after the transaction server receives the trial request, sending the trial request to the target server by the transaction server; wherein between generating, by the target server, the target game data based on the trial request and generating, by the cloud game server, the game interface corresponding to the trial request based on the target game data through the game program, transmitting, by the target server, the target game data to the cloud game server.

A specific content of the cloud game starting methods in these embodiments are also applicable to the embodiments of the cloud game starting methods as described in the above embodiments, and therefore, details are not described herein.

The cloud game starting methods according to the embodiments of the present disclosure may start the game program corresponding to the one or more objects to be traded based on the trial request operation of a user in the transaction interface, and provide a diversified manner for displaying the one or more objects to be traded before a transaction.

As shown in FIG. 7, the computer device 700 further includes a touch display screen 730, a radio frequency circuit 740, an audio circuit 750, an input unit 760, and a power supply 770. The processor 710 is electrically connected to the touch display screen 730, the radio frequency circuit 740, the audio circuit 750, the input unit 760, and the power supply 770, respectively. It will be appreciated by those skilled in the art that a computer device structure shown in FIG. 7 does not constitute a limitation on the computer device, and may include more or less components than illustrated, or may combine certain components, or may have different component arrangements.

The touch screen 730 may be used to display a graphical user interface and to receive operational instructions generated by a user acting on the graphical user interface. The touch display screen 730 may include a display panel and a touch panel. The display panel may be used to display information input by or provided to the user and various graphical user interfaces of the computer device, which may be composed of graphics, text, icons, videos, and any combination thereof. The display panel may be configured in a form of a Liquid Crystal Display (LCD), an Organic Light-Emitting Diode (OLED), or the like. The touch panel may be used to collect a touch operation (e.g., an operation of the player on or near the touch panel using any suitable object or accessory such as a finger, a stylus, etc.) of the user on or near the touch panel, and generate a corresponding operation instruction, and the operation instruction executes a corresponding program. The touch panel may include a touch detection device and a touch controller. The touch detection device detects a touch orientation of the user, detects a signal brought about by the touch operation, and transmits the signal to the touch controller. The touch controller receives touch information from the touch detection device and converts the touch information into contact coordinates, sends the contact coordinates to the processor 710, and can receive and execute commands sent from the processor 710. The touch panel may cover the display panel, and when the touch panel detects the touch operation on or near the touch panel, the touch panel transmits the touch operation to the processor 710 to determine a type of a touch event. Then, the processor 710 provides a corresponding visual output on the display panel according to the type of the touch event. In the embodiments of the present disclosure, the touch panel and the display panel may be integrated into the touch display screen 730 to implement input and output functions. However, in some embodiments, the touch panel and the display panel may be implemented as two separate components to implement input and output functions. That is, the touch display screen 730 may also implement the input function as part of the input unit 760.

In the embodiments of the present disclosure, a game application is executed by the processor 710 to generate a graphical user interface on the touch display screen 730. A virtual scene on the graphical user interface includes at least one skill control area including at least one skill control. The touch display screen 730 may be configured to display the graphical user interface and to receive operational instructions generated by the user acting on the graphical user interface.

The radio frequency circuit 740 may be configured to transmit and receive radio frequency signals to establish wireless communication with a network device or other computer devices through wireless communication, and to transmit and receive signals between the network device or other computer devices.

The audio circuit 750 may be configured to provide an audio interface between the user and the computer device through a speaker and a microphone. The audio circuit 750 may transmit an electrical signal converted from the received audio data to a loudspeaker, and the loudspeaker converts the electrical signal into a sound signal for output. On the other hand, the microphone converts a collected sound signal into an electrical signal, the audio circuit 750 receives and converts the electrical signal into audio data. The audio data is outputted to the processor 710 for processing, and the processed audio data is sent to, for example, another computer device through the radio frequency circuit 740, or the audio data is outputted to the memory 720 for further processing. The audio circuit 750 may also include an earplug jack to provide communication between a peripheral headset and the computer device.

The input unit 760 may be configured to receive input numbers, character information, or user characteristic information (e.g., fingerprints, iris, face information), and to generate keyboard, mouse, joystick, optical, or trackball signal input related to user settings and functional control.

The power supply 770 is configured to power various components of the computer device 700. The power supply 770 may be logically connected to the processor 710 through a power management system, so that functions such as charging, discharging, and power consumption management are managed through the power supply management system. The power supply 770 may also include one or more DC or AC power supplies, a recharging system, a power failure detection circuit, a power converter or inverter, a power status indicator, or any other component.

Although not shown in FIG. 7, the computer device 700 may also include a camera, a sensor, a wireless fidelity module, a Bluetooth module, and the like, and details are not described herein.

In the above-mentioned embodiments, the description of each embodiment has its own emphasis, and parts not described in detail in a certain embodiment may be referred to related description of other embodiments.

As can be seen from the above, the computer device according to the present embodiment may start a game program corresponding to one or more objects to be traded based on a trial request operation of a user in a transaction interface, and provide a diversified manner for displaying the one or more objects to be traded before a transaction.

It will be appreciated by those of ordinary skill in the art that all or a portion of the operations of the various methods of the above-described embodiments may be performed by instructions, which may be stored in a computer-readable storage medium and loaded and executed by a processor, or may be performed by the instructions through controlling relevant hardware.

To this end, an embodiment of the present disclosure provides a computer readable storage medium having stored therein a plurality of computer programs that can be loaded by a processor to perform operations in any of the cloud game starting methods provided in some embodiments of the present disclosure. For example, the computer program may perform operations of the methods of the foregoing various method embodiments, including:

displaying, by a terminal, a transaction interface for displaying information of one or more objects; generating a trial request for the one or more objects to be traded in response to a trial request operation for the one or more objects to be traded in the transaction interface; receiving a game interface corresponding to the trial request from a cloud game server, wherein the game interface includes a virtual scene and one or more virtual objects in the virtual scene respectively corresponding to the one or more objects, the game interface includes a picture corresponding to a video stream sent by the cloud game server, and the video stream includes stream data obtained by encoding a game picture by the cloud game server, the game picture being generated by running a game program that is installed in the cloud game server and corresponds to the trial request; and receiving, by the terminal, a control instruction to control the one or more virtual objects to perform one or more game operations in the virtual scene.

In some embodiments, the trial request corresponds to at least two objects to be traded of the one or more objects, and after receiving the game interface corresponding to the trial request from the cloud game server, the method further include: displaying a first game interface and a switching control by the terminal, wherein the first game interface includes a game interface corresponding to a first object to be traded of the at least two objects, and the switching control is configured to control switching of the first game interface to a second game interface including a game interface corresponding to at least one of the at least two objects to be traded other than the first object.

In some embodiments, after receiving the game interface corresponding to the trial request sent by the cloud game server, the method further includes: generating a switching request in response to a trigger operation for the switching control;

receiving, by the terminal, the second game interface corresponding to the switching request from the cloud game server; and displaying the second game interface by the terminal.

In some embodiments, after receiving the game interface corresponding to the trial request from the cloud game server, the method further includes: displaying the game interface corresponding to the trial request by the terminal.

In some embodiments, the trial request corresponds to at least two different types of objects to be traded of the one or more objects, and the displaying of the game interface corresponding to the trial request by the terminal includes: receiving, by the terminal, game interfaces respectively corresponding to the at least two different types of objects to be traded from the cloud game server; and displaying, by the terminal, the game interface comprising the game interfaces respectively corresponding to the at least two different types of objects to be traded.

In some embodiments, the terminal further displays a storage control, and after receiving the game interface corresponding to the trial request from the cloud game server, the method further includes: storing, by the terminal, identification information of at least one object to be traded of the one or more objects to be traded in a local memory in response to a trigger operation for the storage control; and after the game program corresponding to the trial request is ended, marking a target object to be traded in the transaction interface based on the identification information stored in the local memory to enable a transaction operation on the target object to be traded in the transaction interface, wherein the target object to be traded is an object to be traded corresponding to the identification information stored in the local memory.

Some embodiments of the present disclosure may implement operations of the method of each of the foregoing method embodiments:

receiving, by a target server, a trial request from a terminal, wherein the target server is a game server or a cloud game server, the terminal displays a transaction interface for displaying information of one or more objects to be traded, and the trial request is generated based on a trial request operation for the one or more objects to be traded in the transaction interface; generating, by the target server, target game data based on the trial request; starting, by the cloud game server, a game program corresponding to the trial request; generating, by the cloud game server, a game interface corresponding to the trial request based on the target game data through the game program, wherein the game interface includes a virtual scene and one or more virtual objects in the virtual scene respectively corresponding to the one or more objects, the game interface includes a picture corresponding to a video stream sent by the cloud game server, and the video stream including stream data obtained by encoding a game picture by the cloud game server, the game picture being generated by running a game program that is installed in the cloud game server and corresponds to the trial request; and transmitting, by the cloud game server, the game interface corresponding to the trial request to the terminal.

In some embodiments, the trial request includes identification information of the one or more objects, and generating, by the target server, the target game data based on the trial request: determining, by the target server, a target game corresponding to the one or more objects to be traded based on the identification information of the one or more objects; determining one of a plurality of game service nodes in the target server corresponding to the target game as a target game service node; and generating the target game data at the target game service node based on the trial request.

In some embodiments, the target game data includes virtual character data and virtual prop data, the trial request includes the identification information of the one or more objects to be traded and current user information, the object to be traded includes a virtual prop, and generating the target game data at the target game service node based on the trial request includes: generating the virtual character data corresponding to a current user at the target game service node based on the current user information; and generating the virtual prop data corresponding to the one or more objects to be traded at the target game service node based on the identification information of the one or more objects.

In some embodiments, the target game data further includes virtual scene data, and generating the target game data at the target game service node based on the trial request includes: determining fight force information of a virtual character corresponding to the current user based on the virtual character data corresponding to the current user and the virtual prop data corresponding to the one or more objects; determining a difficulty of the virtual scene based on the fight force information of the virtual character corresponding to the current user; and generating the virtual scene data corresponding to the difficulty at the target game service node.

In some embodiments, the target game data includes virtual character data, the trial request includes identification information of the one or more objects, the one or more objects to be traded includes a virtual character, and generating the target game data at the target game service node based on the trial request includes: generating the virtual character data corresponding to the identification information of the one or more objects to be traded at the target game service node.

In some embodiments, the target game data further includes virtual scene data, and generating the target game data at the target game service node based on the trial request includes: determining fight force information of the one or more objects to be traded based on the virtual character data corresponding to the identification information of the one or more objects; determining a difficulty of the virtual scene based on the fight force information of the one or more objects; and generating the virtual scene data corresponding to the difficulty at the target game service node.

In some embodiments, the cloud game server includes a plurality of trial nodes, and starting, by the cloud game server, the game program corresponding to the trial request includes: determining, by the cloud game server, one of the plurality of trial nodes corresponding to the trial request as a target trial node; and starting the game program corresponding to the trial request at the target trial node.

In some embodiments, the trial request includes current user information and identification information of the one or more objects, after receiving, by the target server, the trial request generated by the terminal and before generating, by the target server, the target game data based on the trial request, the method further includes: verifying the current user information by the target server, so that the target server generates the target game data based on the trial request in response to the current user information passing verification.

In some embodiments, before the receiving, by the target server, the trial request generated by the terminal, the method further includes: receiving, by a transaction server, the trial request from the terminal; and after the transaction server receives the trial request, sending the trial request to the target server by the transaction server; and after generating, by the target server, the target game data based on the trial request and before generating the game interface corresponding to the trial request based on the target game data through the game program, transmitting, by the target server, the target game data to the cloud game server.

A specific content of the cloud game starting method in these embodiments are also applicable to the embodiments of the cloud game starting methods as described in the above embodiments, and therefore, details are not described herein.

The cloud game starting methods according to the embodiments of the present disclosure may start the game program corresponding to the one or more objects to be traded based on the trial request operation of the user in the transaction interface, and provide a diversified manner for displaying the one or more objects to be traded before a transaction.

The storage medium may include a Read Only Memory (ROM), a Random Access Memory (RAM), a magnetic disk, an optical disk, or the like.

Since the computer program stored in the storage medium can perform operations in any one of the cloud game starting methods provided in the embodiments of the present disclosure, advantageous effects that can be achieved in any one of the cloud game starting methods provided in the embodiments of the present disclosure can be realized. The foregoing embodiments can be referred to for details, and details are not described herein.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub- circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present.

What is claimed is:

1. A cloud game starting method, comprising:

receiving, by a target server, a trial request from a terminal, wherein the target server is one of a game server or a cloud game server, and the trial request is generated by the terminal in response to a trial request operation for one or more objects to be traded in a transaction interface displaying information of the one or more objects to be traded, the transaction interface being displayed by the terminal;

generating, by the target server, target game data in response to the trial request;

starting, by the cloud game server, a game program corresponding to the trial request;

generating, by the cloud game server, a game interface corresponding to the trial request based on the target game data through the game program, wherein the game interface comprises a virtual scene and one or more virtual objects in the virtual scene respectively corresponding to the one or more objects to be traded, and the game interface comprises a picture corresponding to a video stream sent by the cloud game server, the video stream comprising stream data obtained by encoding a game picture by the cloud game server, the game picture being generated by running the game program installed in the cloud game server; and transmitting, by the cloud game server, the game interface corresponding to the trial request to the terminal;

wherein the trial request comprises identification information of the one or more objects to be traded, and wherein generating the target game data based on the trial request by the target server comprises:

determining, by the target server, a target game corresponding to the one or more objects to be traded based on the identification information of the one or more objects to be traded;

determining one of a plurality of game service nodes in the target server corresponding to the target game as a target game service node; and generating the target game data at the target game service node based on the trial request.

2. The cloud game starting method of claim 1, wherein the target game data comprises virtual character data and virtual prop data, the trial request further comprises current user information, and the one or more objects to be traded comprises a virtual prop, and wherein generating the target game data at the target game service node based on the trial request comprises:

generating the virtual character data corresponding to a current user at the target game service node based on the current user information; and generating the virtual prop data corresponding to the one or more objects to be traded at the target game service node based on the identification information of the one or more objects to be traded.

3. The cloud game starting method of claim 2, wherein the target game data further comprises virtual scene data, and wherein generating the target game data at the target game service node based on the trial request comprises:

determining fight force information of a virtual character corresponding to the current user based on the virtual character data corresponding to the current user and the virtual prop data corresponding to the one or more objects to be traded;

determining a difficulty of the virtual scene based on the fight force information of the virtual character corresponding to the current user; and generating the virtual scene data corresponding to the difficulty at the target game service node.

4. The cloud game starting method of claim 1, wherein the target game data comprises virtual character data,, the one or more objects to be traded comprises a virtual character, and wherein generating the target game data at the target game service node based on the trial request comprises:

generating the virtual character data corresponding to the identification information of the one or more objects to be traded at the target game service node.

5. The cloud game starting method of claim 4, wherein the target game data further comprises virtual scene data, and wherein generating the target game data at the target game service node based on the trial request comprises:

determining fight force information of the one or more objects to be traded based on the virtual character data corresponding to the identification information of the one or more objects to be traded;

determining a difficulty of the virtual scene based on the fight force information of the one or more objects to be traded; and generating the virtual scene data corresponding to the difficulty at the target game service node.

6. The cloud game starting method of claim 1, wherein the cloud game server comprises a plurality of trial nodes, and wherein starting the game program corresponding to the trial request by the cloud game server comprises:

determining, by the cloud game server, one of the plurality of trial nodes corresponding to the trial request as a target trial node; and starting the game program corresponding to the trial request at the target trial node.

7. The cloud game starting method of claim 6, wherein the plurality of trial nodes are configured to run one or more game programs.

8. The cloud game starting method of claim 1, wherein the trial request comprises current user information and identification information of the one or more objects to be traded, and the method further comprises: after receiving, by the target server, the trial request from the terminal and before generating, by the target server, the target game data based on the trial request, verifying the current user information by the target server, to enable the target server to generate the target game data based on the trial request in response to determining that the current user information is verified.

9. The cloud game starting method of claim 1, wherein the method further comprises:

receiving, by a transaction server, the trial request from the terminal; and receiving, by the target server, the trial request from the transaction server, and the method further comprises: after generating, by the target server, the target game data based on the trial request and before generating, by the cloud game server, the game interface corresponding to the trial request based on the target game data through the game program, transmitting, by the target server, the target game data to the cloud game server.

10. The cloud game starting method of claim 1, wherein the target game data comprises game data for running the game program corresponding to the trial request at a target trial node.

11. The cloud game starting method of claim 1, wherein each of the plurality of game service nodes is configured to provide game data of one of a plurality of different types of games.

* * * * *